US012693004B2

(12) United States Patent
Menendez et al.

(10) Patent No.: US 12,693,004 B2
(45) Date of Patent: Jul. 28, 2026

(54) MODULAR AND ADJUSTABLE RECESSED LIGHT FIXTURE

(71) Applicant: Crestron Electronics, Inc., Rockleigh, NJ (US)

(72) Inventors: Victor M. Menendez, Carrollton, TX (US); Bryan Ortega, Verona, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 120 days.

(21) Appl. No.: 18/654,337

(22) Filed: May 3, 2024

(65) Prior Publication Data

US 2024/0369209 A1 Nov. 7, 2024

Related U.S. Application Data

(60) Provisional application No. 63/463,596, filed on May 3, 2023.

(51) Int. Cl.

| | |
|---|---|
| ***F21V 21/04*** | (2006.01) |
| ***F21S 8/02*** | (2006.01) |
| ***F21V 17/10*** | (2006.01) |
| ***F21V 21/15*** | (2006.01) |
| ***F21V 21/34*** | (2006.01) |

(52) U.S. Cl.

CPC ............ *F21V 21/047* (2013.01); *F21S 8/026* (2013.01); *F21V 17/105* (2013.01); *F21V 21/15* (2013.01); *F21V 21/34* (2013.01)

(58) Field of Classification Search

CPC ...... F21V 21/047; F21V 17/105; F21V 21/15; F21V 21/34; F21S 8/026; F21Y 2115/10

See application file for complete search history.

(56) References Cited

U.S. PATENT DOCUMENTS

| | | |
|---|---|---|
| 1,971,189 A | 8/1934 | Leibing |
| 2,518,936 A | 8/1950 | Arthur |

(Continued)

FOREIGN PATENT DOCUMENTS

| | | |
|---|---|---|
| CN | 206093695 U * | 4/2017 |
| WO | WO2021159189 | 8/2021 |

OTHER PUBLICATIONS

Harmony Recessed 2" Square Downlight Install, Jan. 2018, www.lightandgreen.com/wp-content/uploads/2018/01/install/LG-9018AC.pdf.

*Primary Examiner* — Elmito Breval

(74) *Attorney, Agent, or Firm* — Crestron Electronics, Inc.

(57) ABSTRACT

Systems, methods, and modes for a modular recessed light fixture and for mounting and aligning thereof. The light fixture comprises a housing supporting a lighting module, a bracket ring located within the housing, and an alignment ring adapted to magnetically attach to the bracket ring through an architectural panel to locate the bracket ring. The alignment ring may comprise an adjustment mechanism that is laterally adjusted within the alignment ring to a desired position. The bracket ring may be adjustable and adapted to laterally travel with respect to the housing such that displacing the alignment ring along the architectural panel, moves the adjustable bracket ring within the housing to a desired position. The housing may comprise a baseplate comprising material capable of being cut such that after locating the bracket ring using the alignment ring an opening is cut through the architectural panel and the housing baseplate.

22 Claims, 16 Drawing Sheets

(56) References Cited

U.S. PATENT DOCUMENTS 3,518,420 A 6/1970 Kripp
3,609,346 A 9/1971 Lund et al.
3,660,651 A 5/1972 Miles, Jr.
3,974,371 A 8/1976 Miles, Jr.
4,232,361 A 11/1980 Kelsall
4,293,895 A 10/1981 Kristofek
4,306,279 A 12/1981 Cohen
4,388,890 A 6/1983 Wester et al.
4,729,080 A 3/1988 Fremont
5,130,914 A 7/1992 Bengochea
5,145,249 A 9/1992 Bruckner
5,257,775 A 11/1993 Burns
5,291,381 A 3/1994 Price
5,457,617 A 10/1995 Chan et al.
5,505,419 A 4/1996 Gabrius
5,548,499 A 8/1996 Zadeh
5,562,343 A 10/1996 Chan et al.
5,609,413 A 3/1997 Lecluze
5,609,414 A 3/1997 Caluori
5,823,664 A 10/1998 Demshki, Jr. et al.
6,004,011 A 12/1999 Sieczkowski
6,082,878 A 7/2000 Doubek et al.
6,371,628 B1 4/2002 Ward
6,375,338 B1 4/2002 Cummings et al.
6,452,097 B1 9/2002 DeWall
6,554,457 B1 4/2003 Platt
6,655,817 B2 12/2003 Devli et al.
6,708,421 B1 3/2004 Crorey
6,779,908 B1 8/2004 Ng
7,234,674 B2 6/2007 Rippel et al.
7,303,314 B2 12/2007 Jones
7,311,422 B1 12/2007 Chen
7,434,327 B2 10/2008 Crorey
7,476,008 B2 1/2009 Kay
7,530,705 B2 5/2009 Czec et al.
7,549,780 B2 6/2009 Caluori
7,559,677 B1 7/2009 Dupre
7,600,899 B2 10/2009 Chen
7,618,166 B1 11/2009 Truax et al.
7,654,705 B2 2/2010 Czech et al.
7,748,868 B2 7/2010 Patti et al.
7,832,889 B1 11/2010 Cogliano
7,854,537 B2 12/2010 Caluori
7,874,709 B1 1/2011 Beadle
7,967,481 B2 6/2011 Seo
8,066,413 B2 11/2011 Czec et al.
8,100,565 B2 1/2012 Patti et al.
8,132,943 B2 3/2012 Wang
8,215,805 B2 7/2012 Cogliano et al.
8,226,278 B2 7/2012 Ward et al.
8,297,804 B2 10/2012 Buse
8,328,382 B2 12/2012 Crooks et al.
8,342,721 B2 1/2013 Park et al.
8,376,594 B2 2/2013 Park et al.
8,403,533 B1 3/2013 Paulsel
8,408,758 B2 4/2013 Patti et al.
8,469,536 B2 6/2013 Cogliano
8,550,669 B2 10/2013 Macwan et al.
8,777,459 B2 7/2014 Patti et al.
8,794,803 B1 8/2014 Paulsel
9,039,254 B2 5/2015 Danesh
9,146,020 B2 9/2015 Devlin
9,157,609 B2 10/2015 Gatof
9,239,149 B2 1/2016 Vice et al.
9,383,087 B2 7/2016 Doust
9,404,643 B2 8/2016 Clark
9,429,284 B2 8/2016 Park et al.
9,447,953 B2 9/2016 Lawlor
9,591,390 B2 3/2017 Humphreys et al.
9,599,295 B2 3/2017 Delano
9,657,933 B2 5/2017 Clark
9,671,091 B2 6/2017 Jones
9,689,565 B2 6/2017 Fryzek
9,726,354 B1 8/2017 Delano et al.
9,756,709 B2 9/2017 Raza et al.
9,822,957 B2 11/2017 Coakley et al.
9,851,081 B2 12/2017 Clark
9,857,038 B2 1/2018 Coakley et al.
9,964,293 B2 5/2018 Devlin
10,024,523 B2 7/2018 Delano
10,168,035 B2 1/2019 Bardot
10,174,891 B1 1/2019 Zheng et al.
10,247,393 B2 4/2019 Clark et al.
10,274,148 B2 4/2019 Eidsvold et al.
10,344,958 B2 7/2019 Mathews et al.
10,371,329 B2 8/2019 Coakle et al.
10,557,618 B2 2/2020 Ernst
10,557,622 B2 2/2020 Highbridge
10,591,146 B1 3/2020 Berry
10,605,419 B2 3/2020 Jones et al.
10,823,349 B2 11/2020 Coakley et al.
10,948,167 B2 3/2021 Wilcox
11,085,615 B2 8/2021 Sevack et al.
11,092,314 B2 8/2021 Maghnagi et al.
11,204,157 B2 12/2021 Maghnagi et al.
11,215,345 B2 1/2022 Maghnagi et al.
11,320,101 B2 5/2022 Coakley et al.
11,454,382 B1 * 9/2022 Wong .................... F21V 21/108
11,460,157 B2 10/2022 Cohen et al.
11,460,172 B2 10/2022 Ameloot et al.
11,725,788 B2 8/2023 Jones
2007/0268701 A1 11/2007 Devlin
2022/0260219 A1 8/2022 Coakley
2022/0290982 A1 9/2022 Rose
2022/0349535 A1 11/2022 Sonneman

* cited by examiner

MODULAR AND ADJUSTABLE RECESSED LIGHT FIXTURE

BACKGROUND OF THE INVENTION

Technical Field

Aspects of the embodiments relate to recessed light fixtures, and more specifically to systems, methods, and modes for a modular recessed light fixture as well as to systems, methods, and modes for mounting and aligning recessed light fixtures.

Background Art

Recessed lighting is widely utilized in both commercial and residential settings to accomplish various lighting effects with minimalistic and hidden look. Recessed light fixtures can be dispersed to provide substantially equal ambiance throughout a room or can be strategically placed and directed to concentrate light to illuminate a particular object or area. Beneficially they can increase light in a room, make spaces appear larger, and highlight workspaces or artwork.

A typical recessed light fixture consists of a housing designed to be installed between ceiling joists or beams, a lighting module within the housing that provides the light source, and accessories such as optics, trims, and flanges for directing light and to add visual aesthetics. To accomplish various lighting effects, recessed light fixtures come in various sizes, shapes, beam angles, and light output power, colors, color temperatures, and other specifications. This requires a lighting manufacturer to stock a large amount of various lighting fixture sizes and specification versions. Accordingly, a need has arisen for a modular recessed light fixture that can be assembled using modular components to achieve various installation requirements.

Installation of recessed lighting is also a difficult undertaking. Recessed light fixtures are installed above the ceiling plane between ceiling joists, and illuminate through an opening in the ceiling, typically drywall. In new construction projects, recessed light fixtures are typically installed and centered according to a dimensional plan before drywall is installed. The drywall is then installed with the position of the fixture housing opening determined through measurements and marked on the drywall with tape and/or markings. Once the fixture housing opening is marked, a hole saw or rotary saw is used to cut an opening in the drywall to expose the fixture through the ceiling. In architectural lighting projects, positioning and alignment is critical. One issue arises when the drywall hole is not aligned with the light fixture housing opening, causing light to bleed around the edges of the trim. As the desired apertures are much smaller in architectural lighting projects, the installer often has to replace various sections of drywall to achieve perfect alignment between the openings of the housing and the drywall below.

Another issue is that it can often be difficult to ensure that all fixtures in a line or group are perfectly aligned when being installed, particularly if the required ceiling aperture is small. This problem is compounded with square light fixtures since misalignment of their straight edges is readily noticeable. This issue arises frequently after the drywall has been cut, taped, and painted, as well as once light fixture trims are put in place.

Accordingly, a need has also arisen for systems, methods, and modes for a simpler and more effective mounting and aligning of recessed light fixtures.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a modular recessed light fixture.

It is also a general aspect of the embodiments to provide systems, methods, and modes for mounting and aligning recessed light fixtures.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, a light fixture assembly is provided comprising: a housing that supports a lighting module, a bracket ring located within the housing and comprising an opening, and an alignment ring. The alignment ring is adapted to magnetically attach to the bracket ring through an architectural panel to locate the bracket ring. The alignment ring comprises an adjustment mechanism that is laterally adjusted within the alignment ring to a desired position and a guide for indicating the desired position of an opening to be created in the architectural panel. After creating the opening in the architectural panel, light is adapted to exit from the lighting module through the bracket ring opening and the architectural panel opening.

According to an embodiment, the alignment ring comprises an opening and an annular channel formed along the opening, wherein the adjustment mechanism comprises a rotating bar comprising opposite ends that are received within the annular channel such that the rotating bar rotates within the alignment ring opening. According to a further embodiment, each opposite end of the rotating bar comprises protrusions or ball bearings that are captured and travel within the annular channel. The adjustment mechanism may further comprise a disc that longitudinally travels along the rotating bar, wherein the disc comprises the guide and is laterally adjusted within the alignment ring opening to the desired position.

According to an embodiment, at least one of the alignment ring and the bracket ring comprises a plurality of magnets circumferentially dispersed thereon. According to another embodiment, at least one of the bracket ring and the alignment ring comprise at least one of a metal material, a magnetic material, and any combinations thereof.

According to an embodiment, the light fixture assembly further comprising a lighting module holder within the housing, wherein the lighting module is removably attached to the lighting module holder. Wherein after the opening is created through the architectural panel, the lighting module is inserted through the architectural panel opening and the bracket ring opening and attached to the lighting module holder.

According to an embodiment, the alignment ring comprises a plurality of alignment indicators to facilitate alignment with other light fixture assemblies.

According to an embodiment, the housing comprises a housing baseplate located adjacent the bracket ring, wherein the housing baseplate comprises a material capable of being cut such that after locating the bracket ring using the alignment ring an additional opening is cut through the housing baseplate corresponding to the desired position. According to an embodiment, the baseplate is adapted to be cut by at least one of a hole saw, a rotor saw, a hole cutting drill bit.

According to an embodiment, the bracket ring comprises an adjustable bracket ring adapted to laterally travel with respect to the housing; wherein after attaching the alignment ring to the bracket ring through the architectural panel, displacing the alignment ring along the architectural panel moves the adjustable bracket ring within the housing.

According to another aspect of the embodiments, a light fixture assembly is provided comprising: a housing that supports a lighting module and comprising a housing baseplate, a bracket ring located within the housing adjacent the housing baseplate and comprising an opening, and an alignment ring adapted to magnetically attach to the bracket ring through an architectural panel and the housing baseplate to locate the bracket ring. The alignment ring comprises a guide for indicating a desired position of an opening to be created in the architectural panel and the base plate. The housing baseplate comprises a material capable of being cut such that after locating the bracket ring using the alignment ring an opening is cut through the architectural panel and the housing baseplate corresponding to the desired position. After creating the opening in the architectural panel, light is adapted to exit from the lighting module through the bracket ring opening, the baseplate opening, and the architectural panel opening.

According to an embodiment, the alignment ring comprises an adjustment mechanism that is laterally adjusted within the alignment ring to the desired position. According to an embodiment, the bracket ring is an adjustable bracket ring adapted to laterally travel with respect to the housing. After attaching the alignment ring to the bracket ring through the architectural panel, displacing the alignment ring along the architectural panel moves the adjustable bracket ring within the housing.

According to an embodiment, the baseplate is adapted to be cut by at least one of a hole saw, a rotor saw, a hole cutting drill bit.

According to yet another aspect of the embodiments, a light fixture assembly is provided comprising: a housing that supports a lighting module; an adjustable bracket ring located within the housing and comprising an opening, wherein the adjustable bracket ring is adapted to laterally travel with respect to the housing; and an alignment ring adapted to magnetically attach to the bracket ring through an architectural panel to locate the bracket ring. The alignment ring is adapted to be displaced along the architectural panel and move the adjustable bracket ring within the housing to a desired position. The alignment ring comprises a guide for indicating the desired position of an opening to be created in the architectural panel. After creating the opening in the architectural panel, light is adapted to exit from the lighting module through the adjustable bracket opening and architectural panel opening.

According to an embodiment, the housing comprises a housing baseplate located adjacent the adjustable bracket ring, wherein the housing baseplate comprises a material capable of being cut such that after locating the bracket ring using the alignment ring an additional opening is cut through the housing baseplate corresponding to the desired position.

According to an embodiment, the adjustable bracket ring is slidably disposed between a first pair of parallel rails such that the adjustable bracket ring slidably travels along the first pair of rails. According to yet another embodiment, the first pair of rails are slidably disposed between a second pair of parallel rails such that the adjustable bracket ring also slidably travels along the second pair of rails. According to another embodiment, the adjustable bracket ring comprises a gear ring that slidably travels along at least one of a linear gear rail, a worm gear, and any combinations thereof. According to an embodiment, the worm gear is actuated by a motor. According to another embodiment, the adjustable bracket ring comprises a worm gear linear actuator that travels along a linear worm gear.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
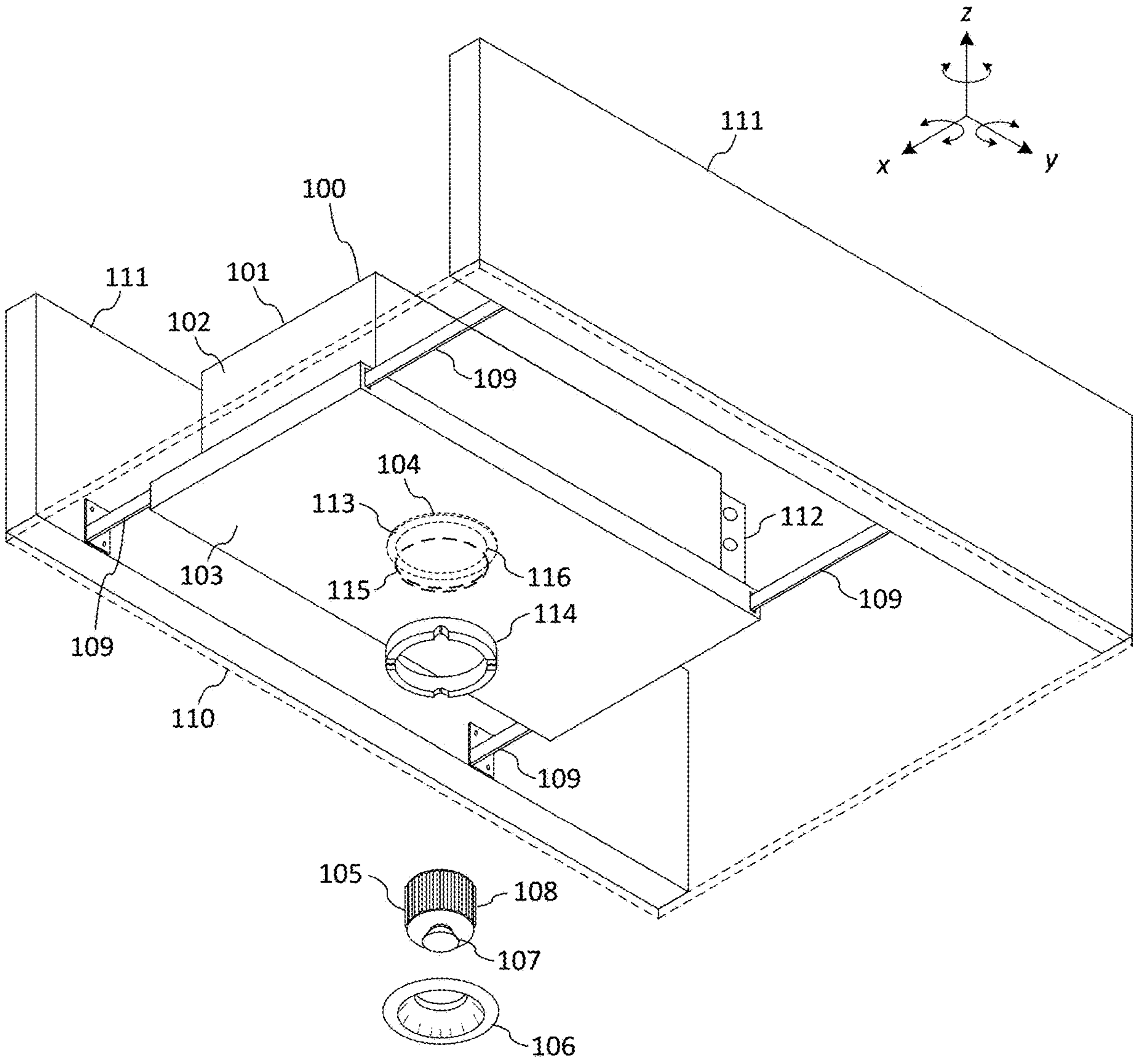

FIG. 1 illustrates a perspective view of a recessed light fixture installed in the ceiling according to an illustrative embodiment.

Figure 2:
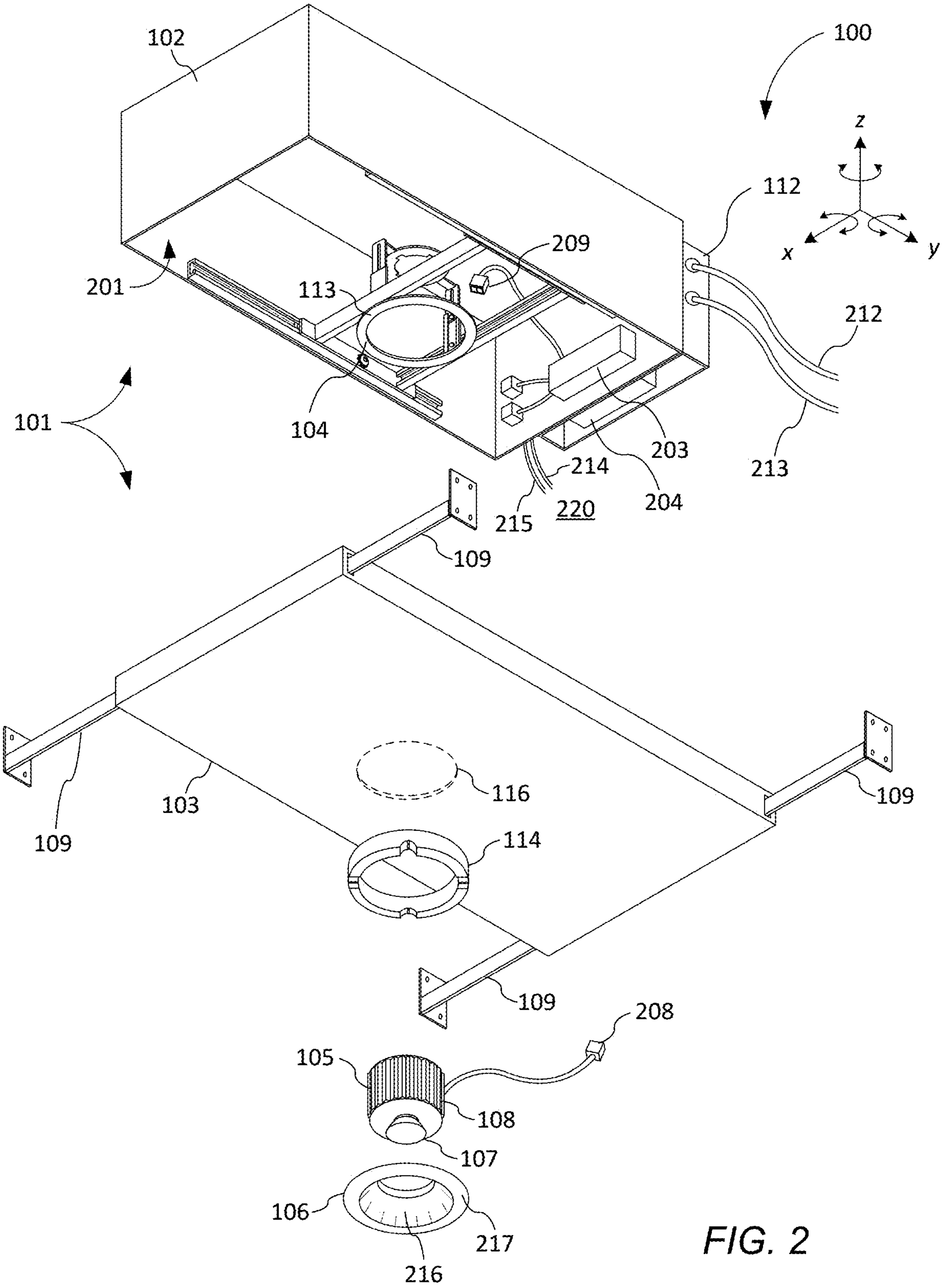

FIG. 2 illustrates an exploded perspective view the light fixture according to an illustrative embodiment.

Figure 3:
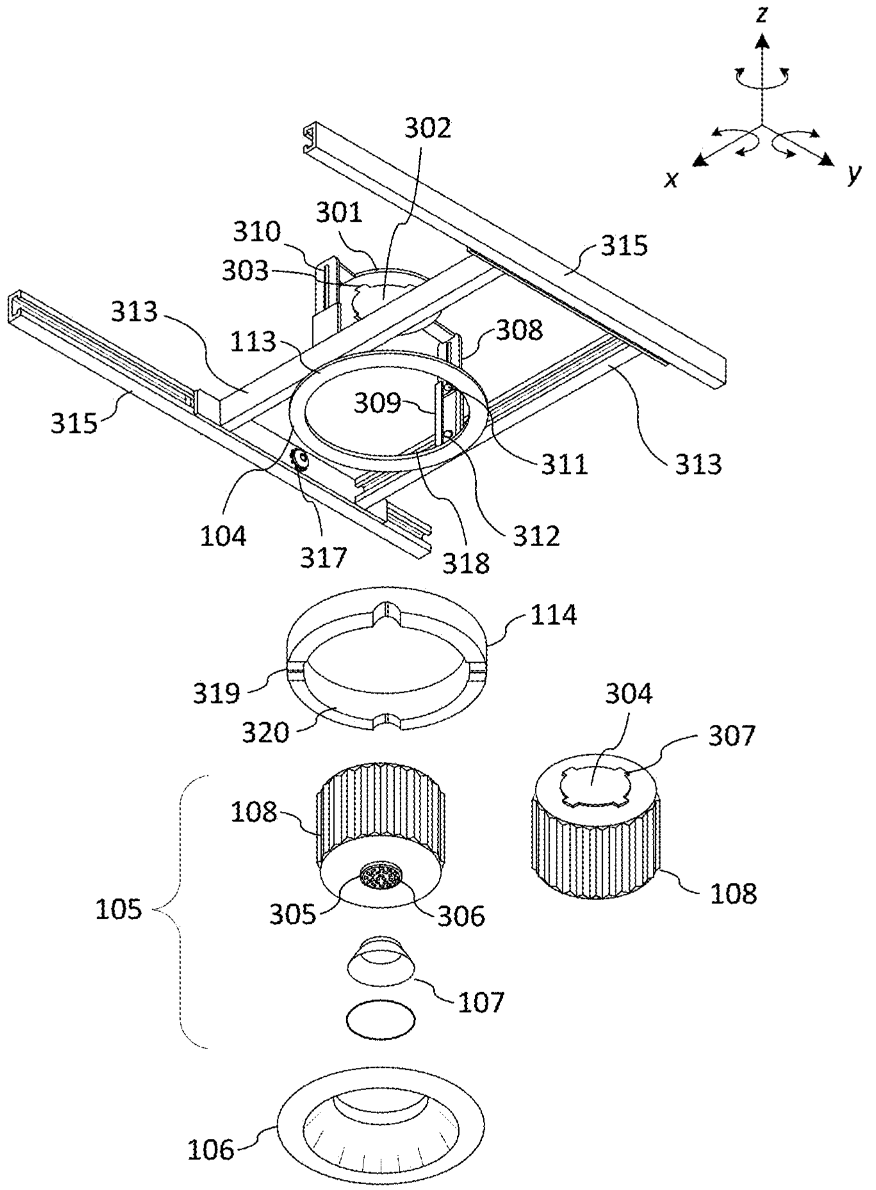

FIG. 3 illustrates an exploded perspective view of a portion of mechanical and electrical components of the recessed light fixture according to an illustrative embodiment.

Figure 4:
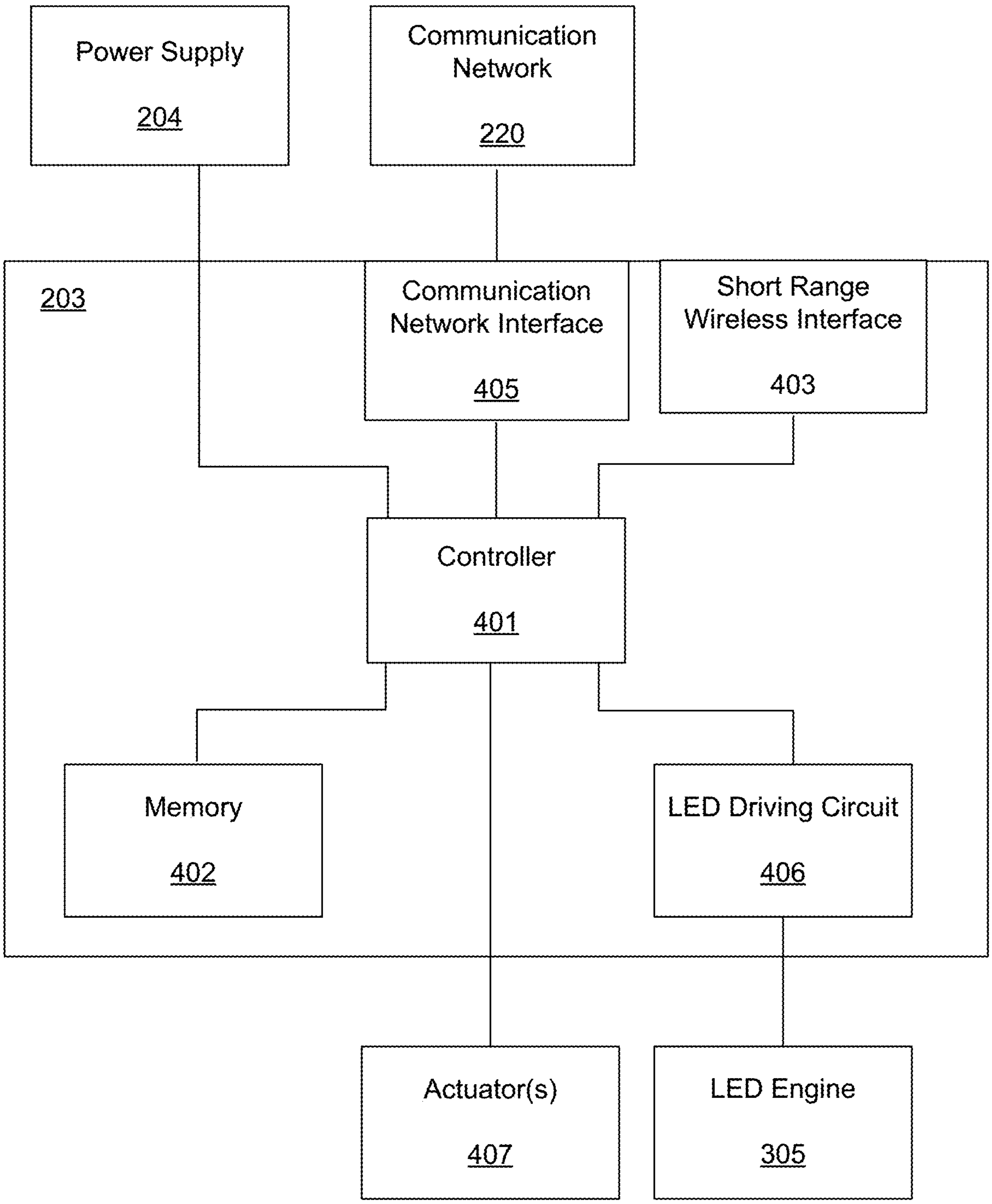

FIG. 4 illustrates a block diagram of the electrical components of the light fixture according to an illustrative embodiment.

Figure 5:
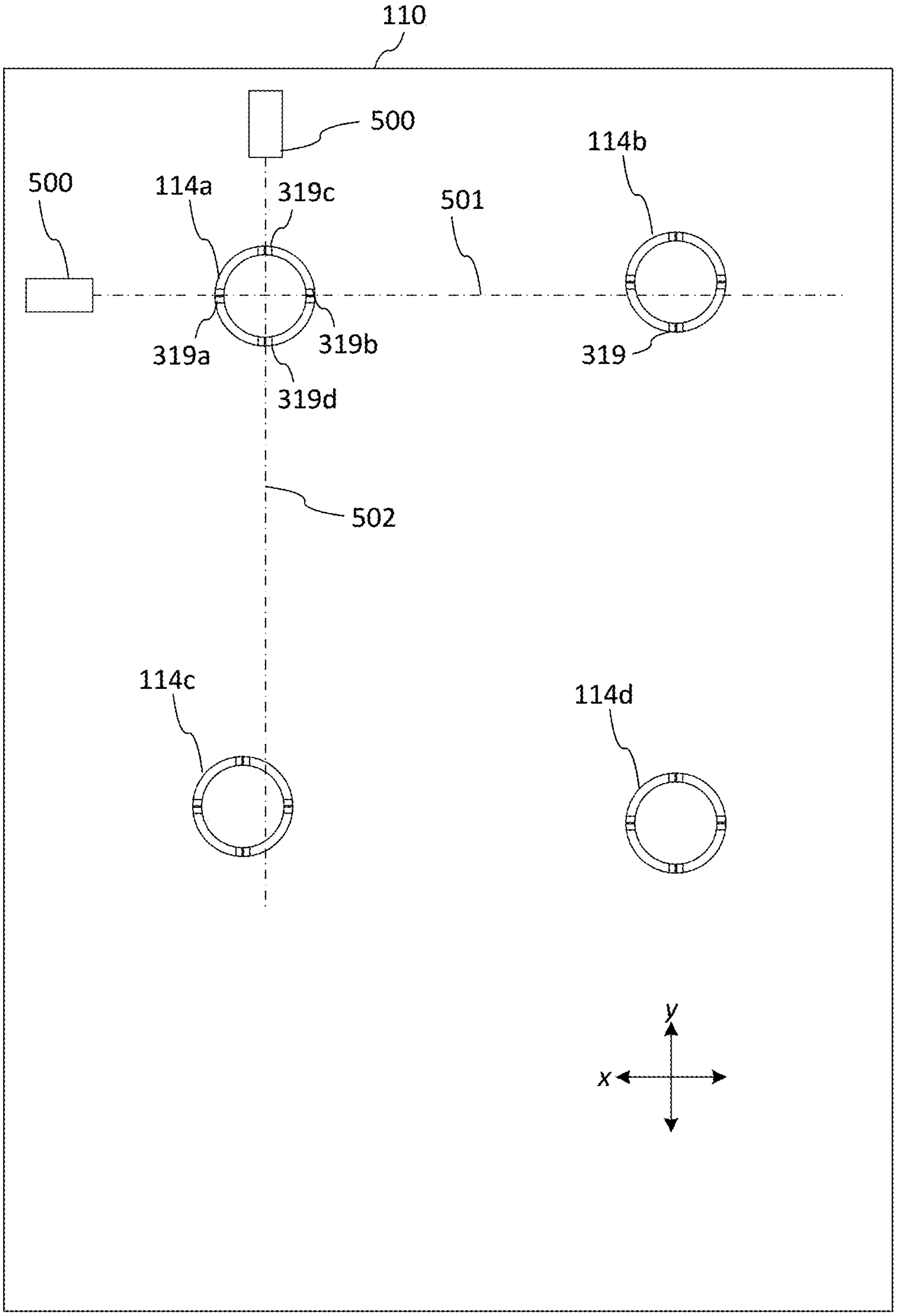

FIG. 5 illustrates a bottom view of a plurality of installed light fixtures to be adjusted according to an illustrative embodiment.

Figure 6A:
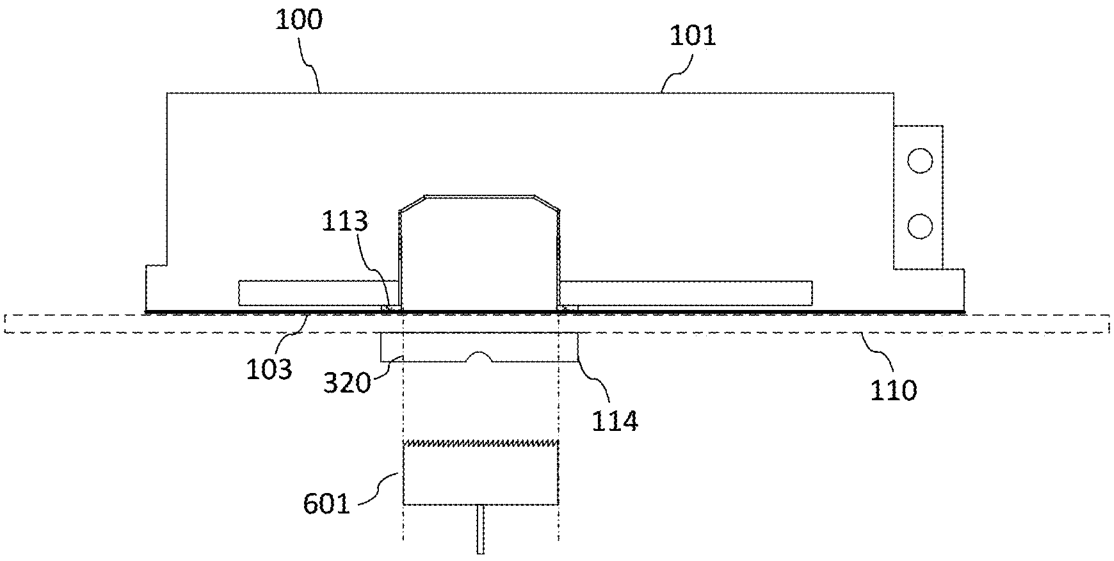
Figure 6B:
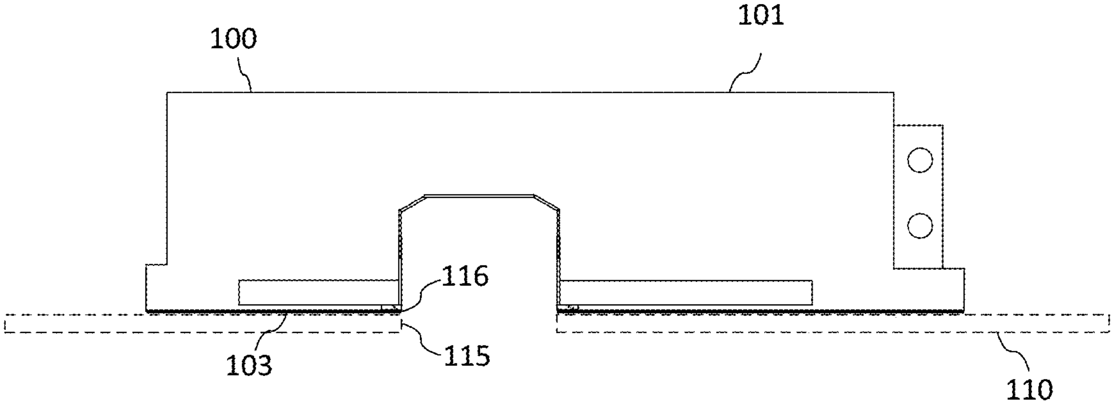
Figure 6C:
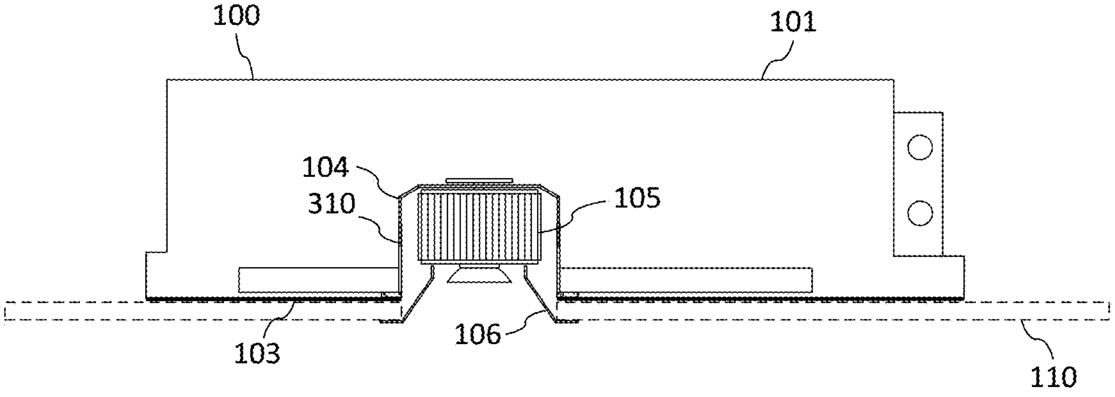

FIGS. 6A-6C illustrate exemplary steps of cutting openings through the ceiling panel and the baseplate of the housing via an alignment ring according to an illustrative embodiment.

Figure 7:
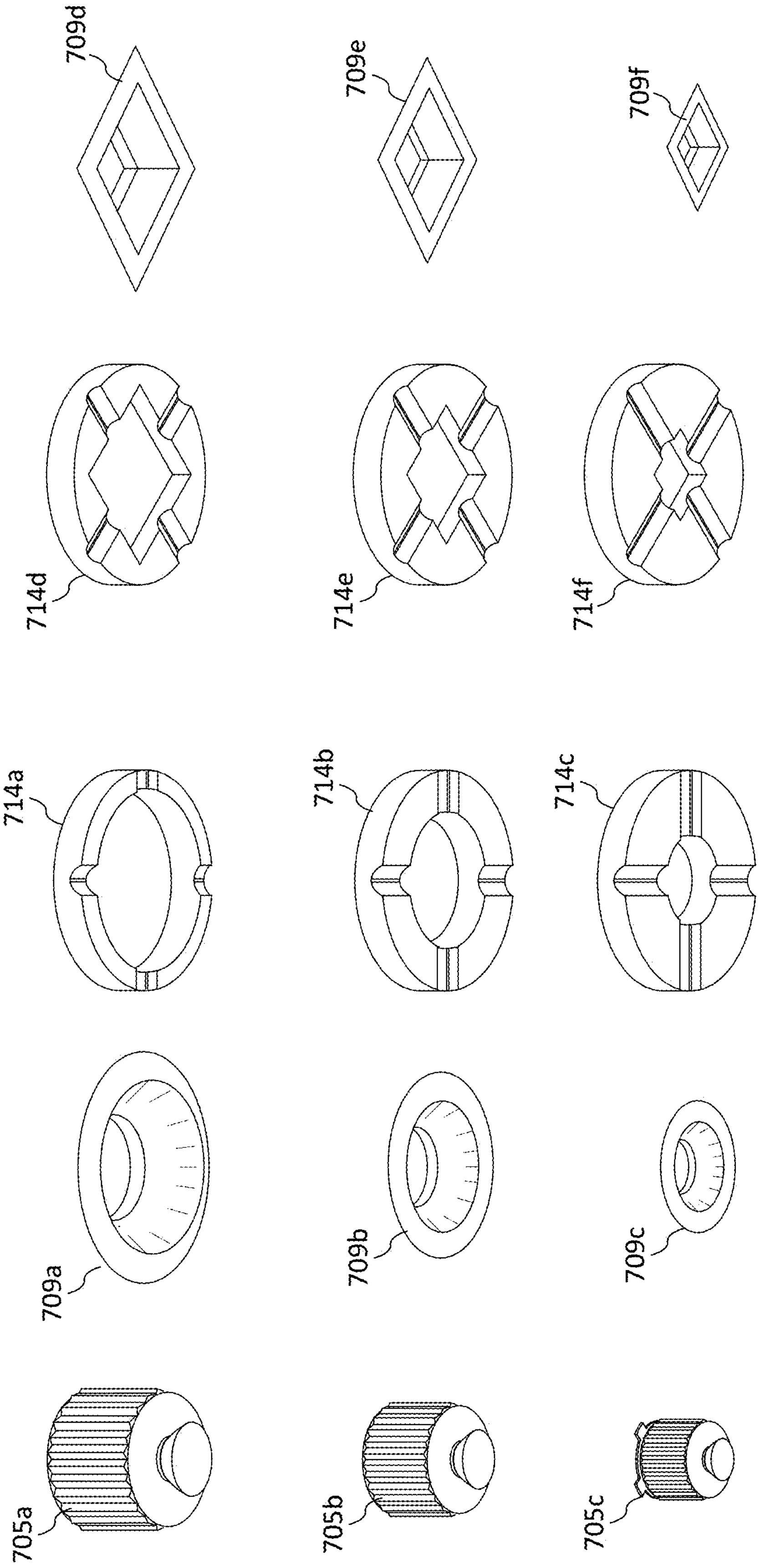

FIG. 7 illustrates perspective views of a plurality of alignment rings, lighting modules, and light fixture trims of varying sizes and shapes according to an illustrative embodiment.

Figure 8:
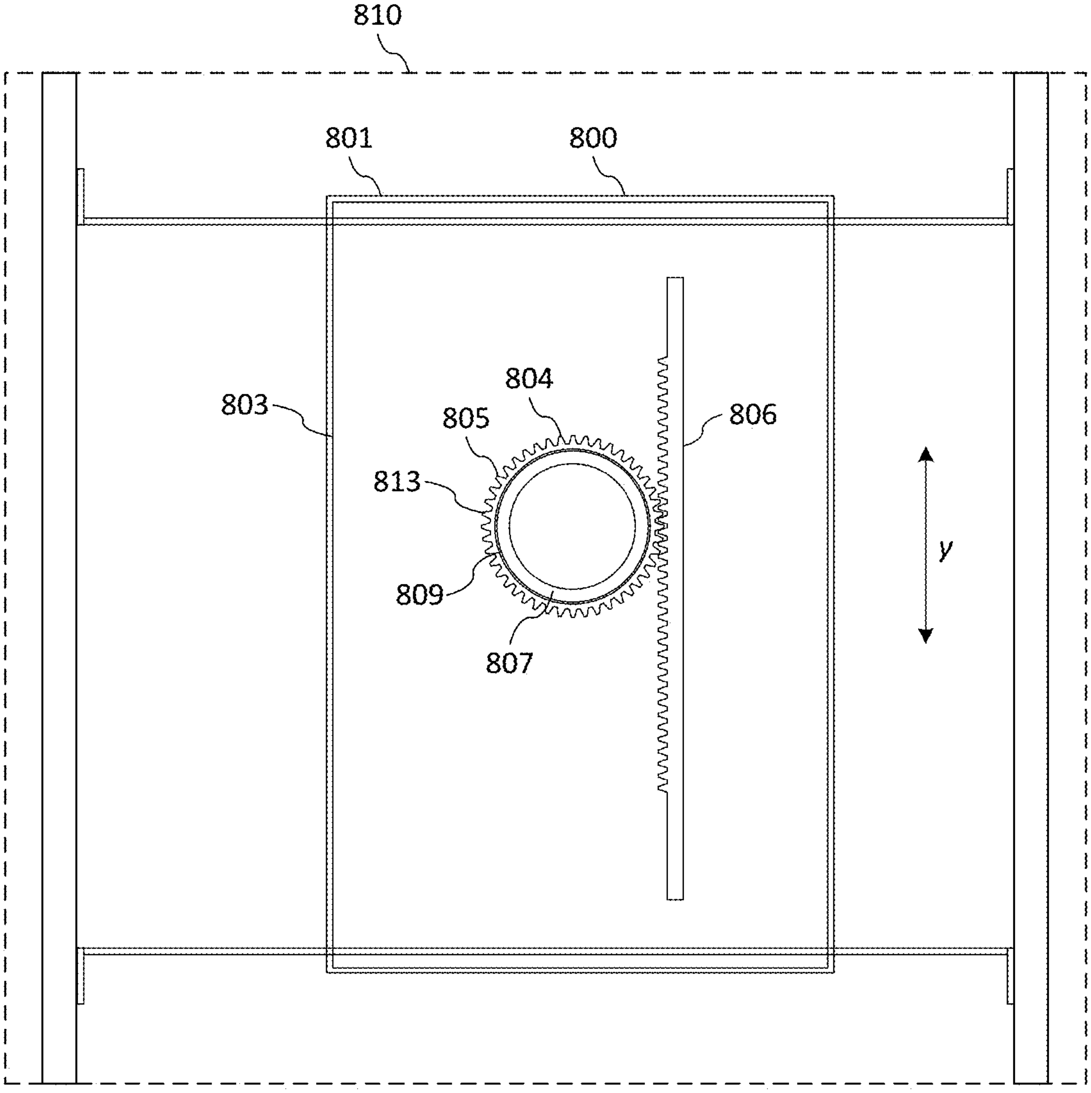

FIG. 8 illustrates a top partial view of an adjustable bracket of a light fixture according to another illustrative embodiment.

Figure 9:
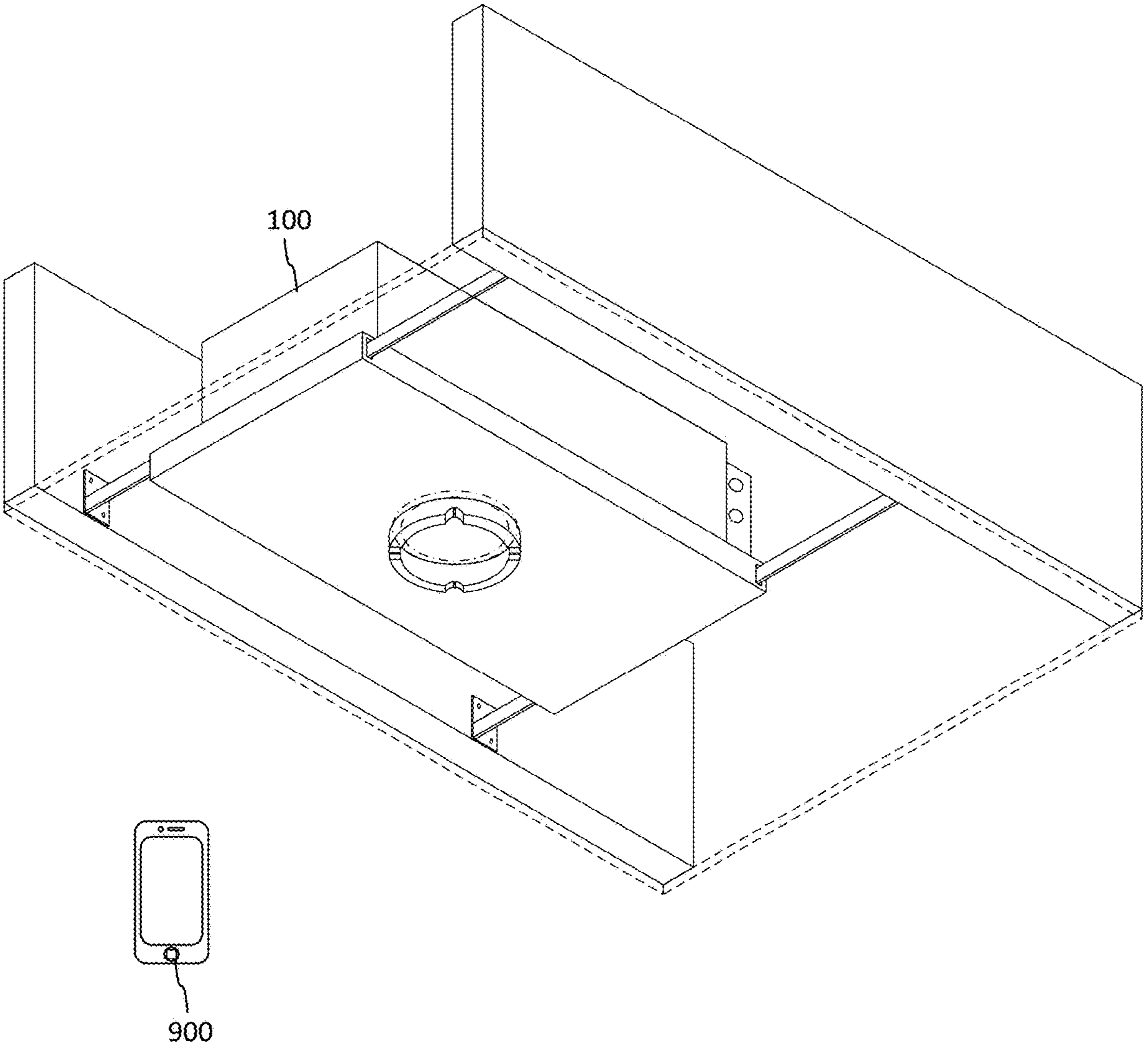

FIG. 9 illustrates perspective view of a recessed light fixture installed in the ceiling and electrically adjusted via a wireless communication device according to an illustrative embodiment.

Figure 10:
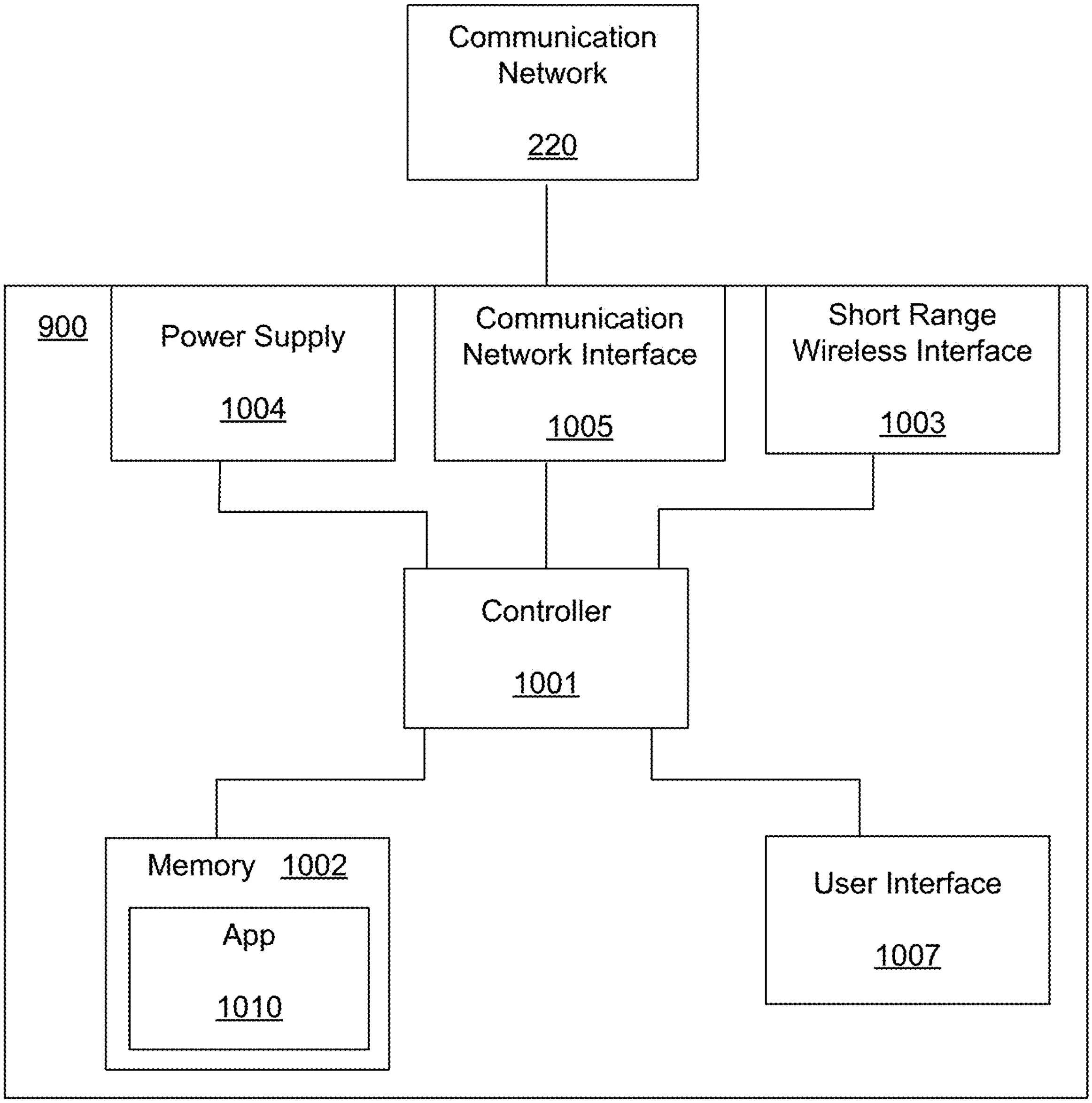

FIG. 10 illustrates a block diagram of a wireless communications device according to an illustrative embodiment.

Figure 11:
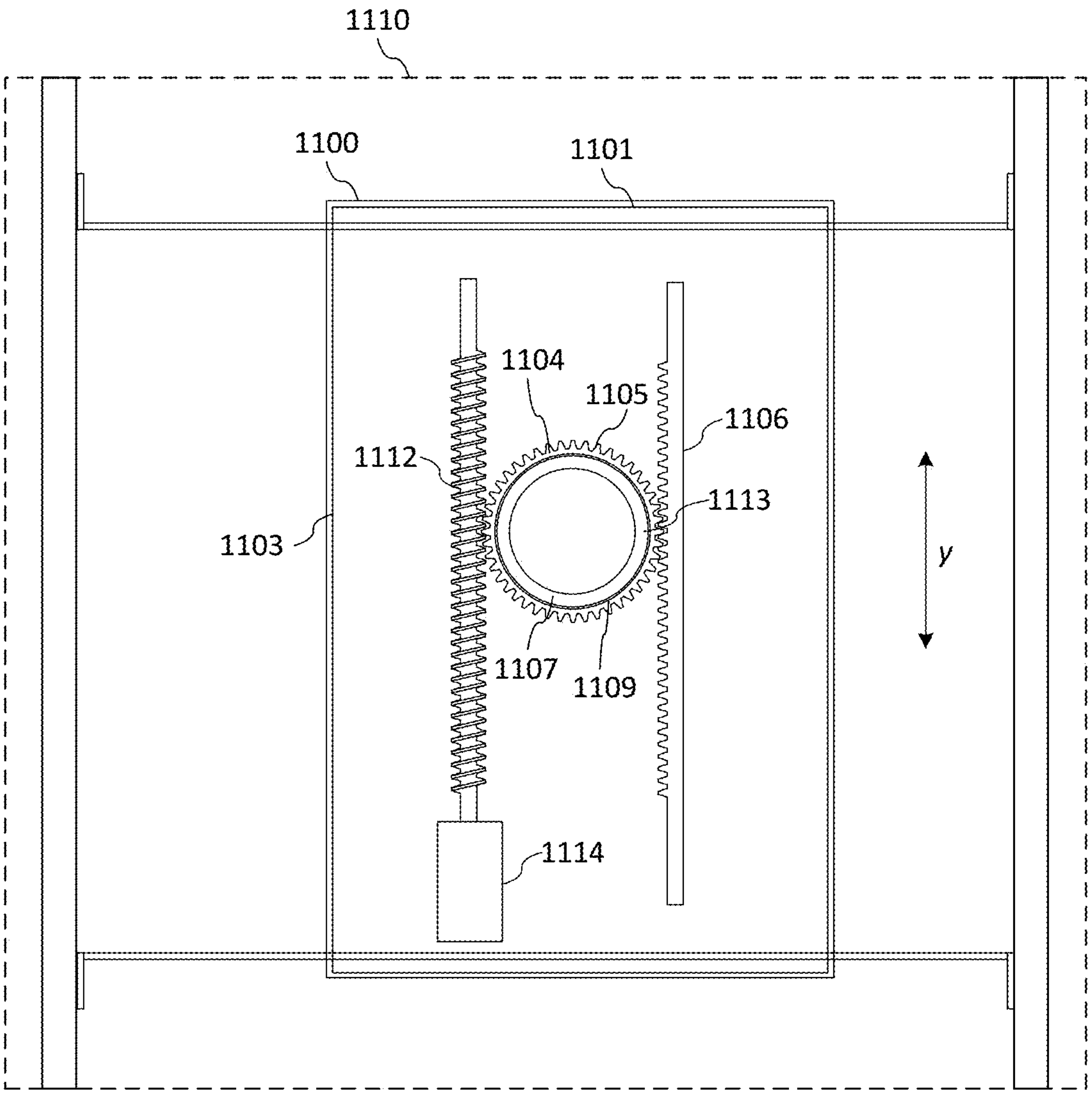

FIG. 11 illustrates a top partial view of an adjustable bracket of a light fixture that can be electrically adjusted according to an illustrative embodiment.

Figure 12:
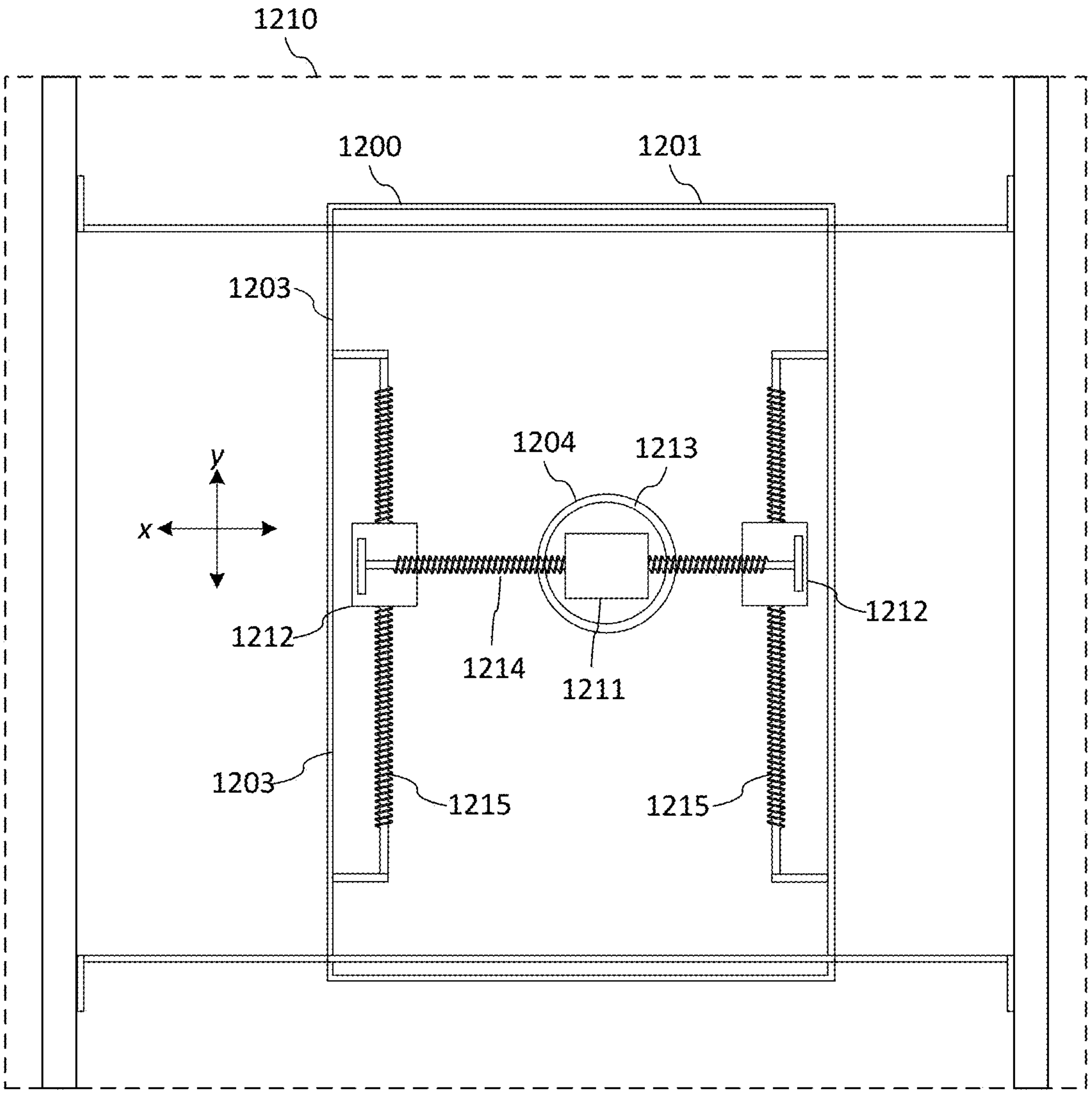

FIG. 12 illustrates a top partial view of an adjustable bracket of a light fixture that can be electrically adjusted according to another illustrative embodiment.

Figure 13:
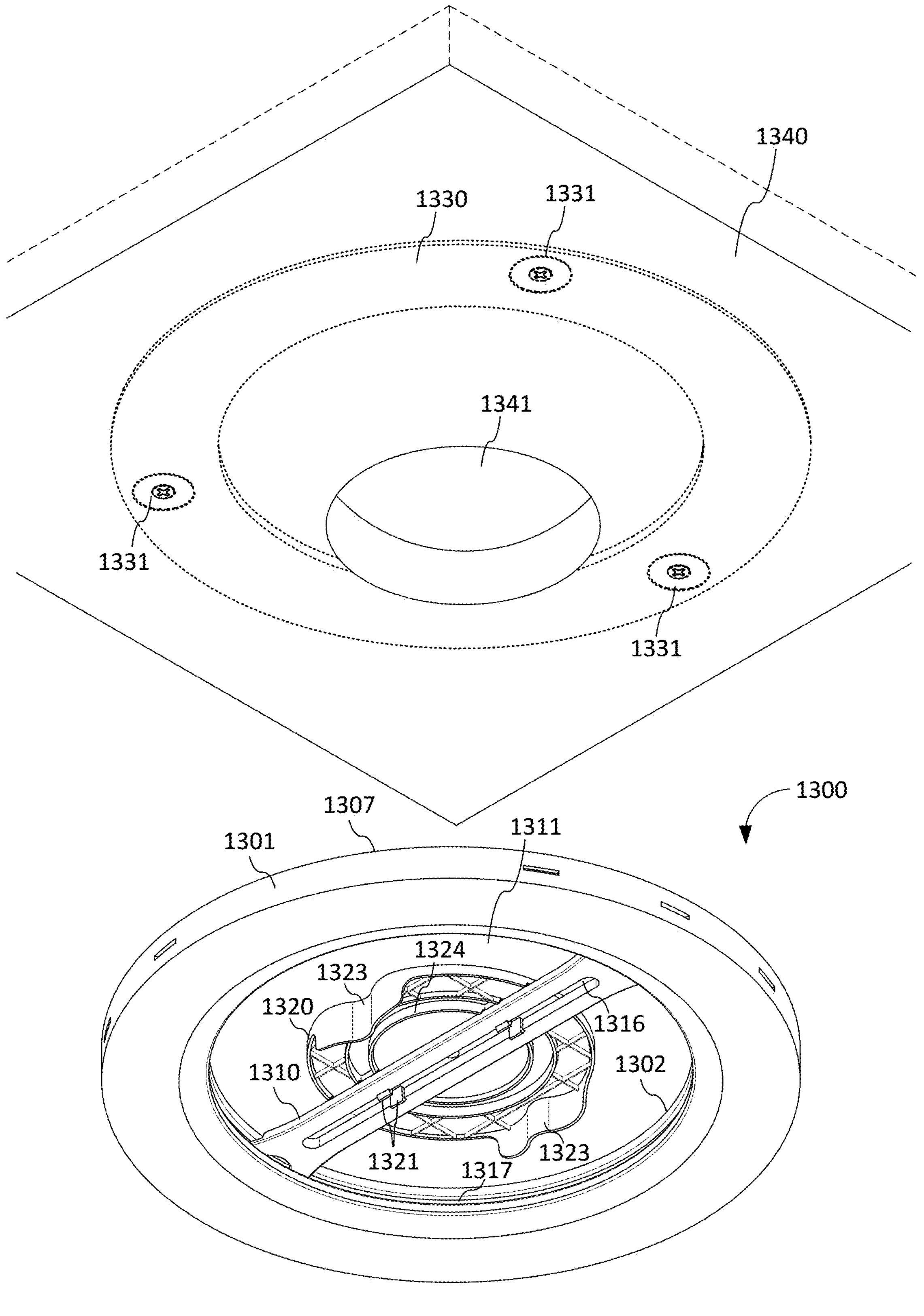

FIG. 13 illustrates a bottom perspective view of an alignment ring according to an illustrative embodiment.

Figure 14:
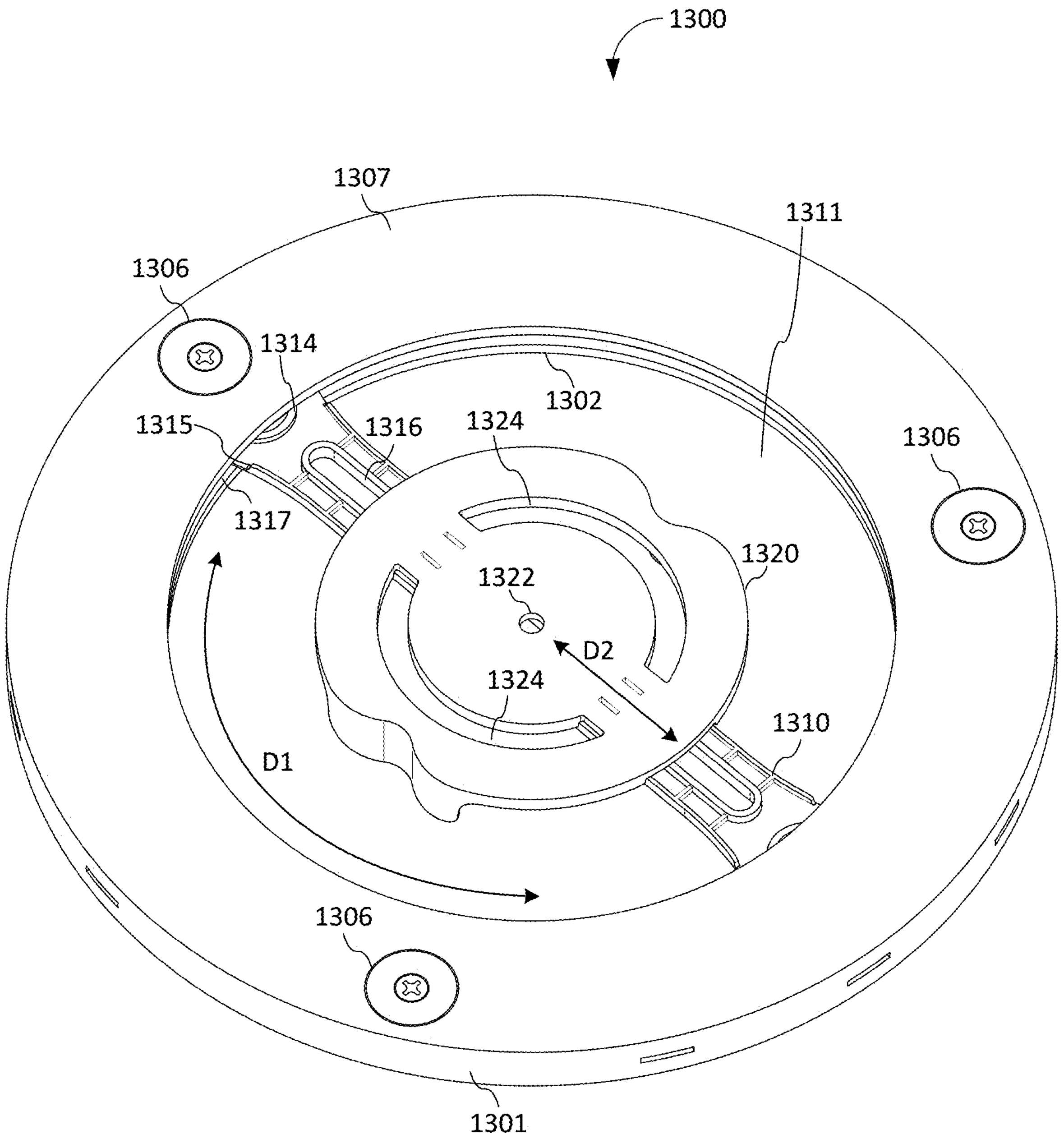

FIG. 14 illustrates a top perspective view of the alignment ring according to an illustrative embodiment.

Figure 15:
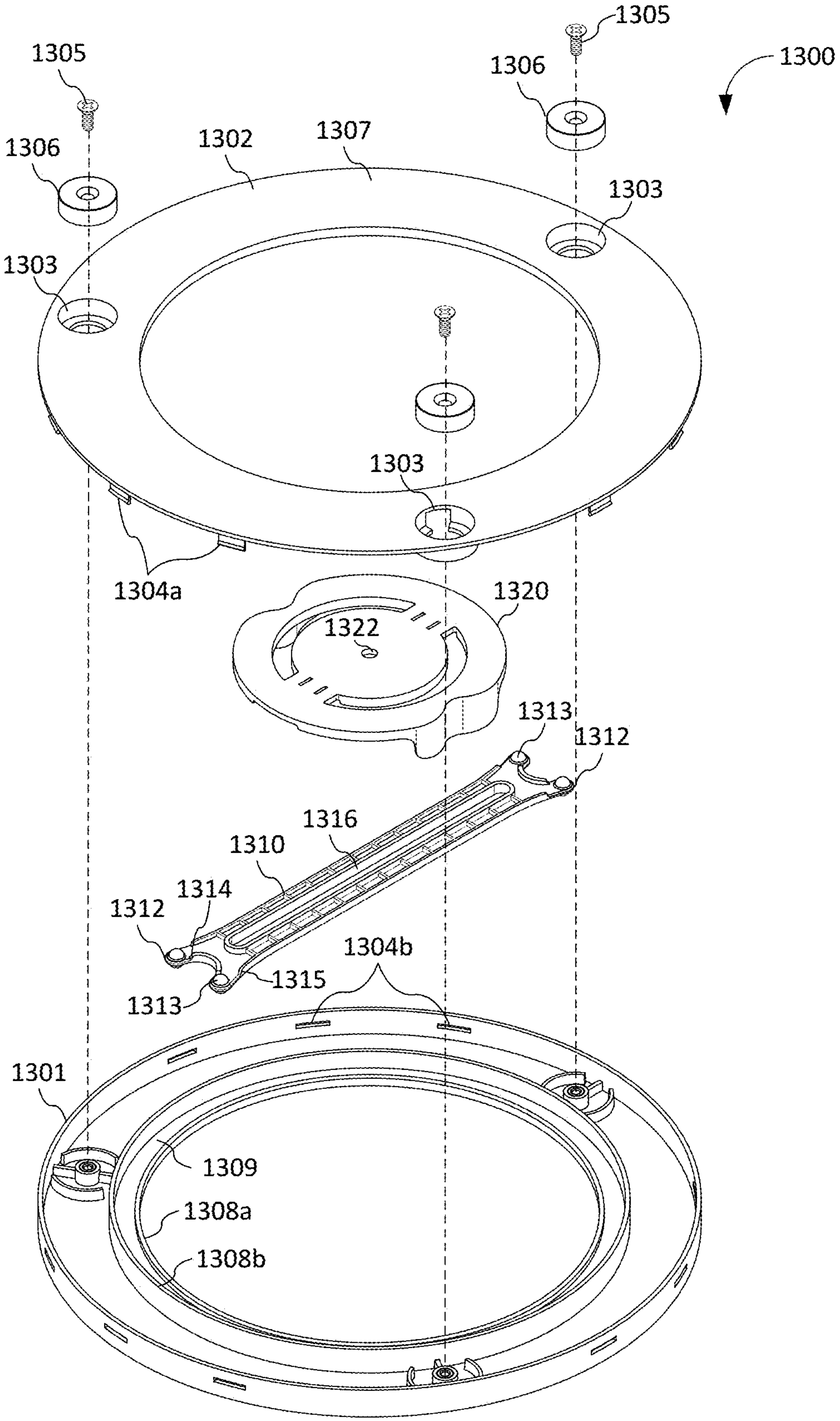

FIG. 15 illustrates a top exploded view of the alignment ring according to an illustrative embodiment.

Figure 16:
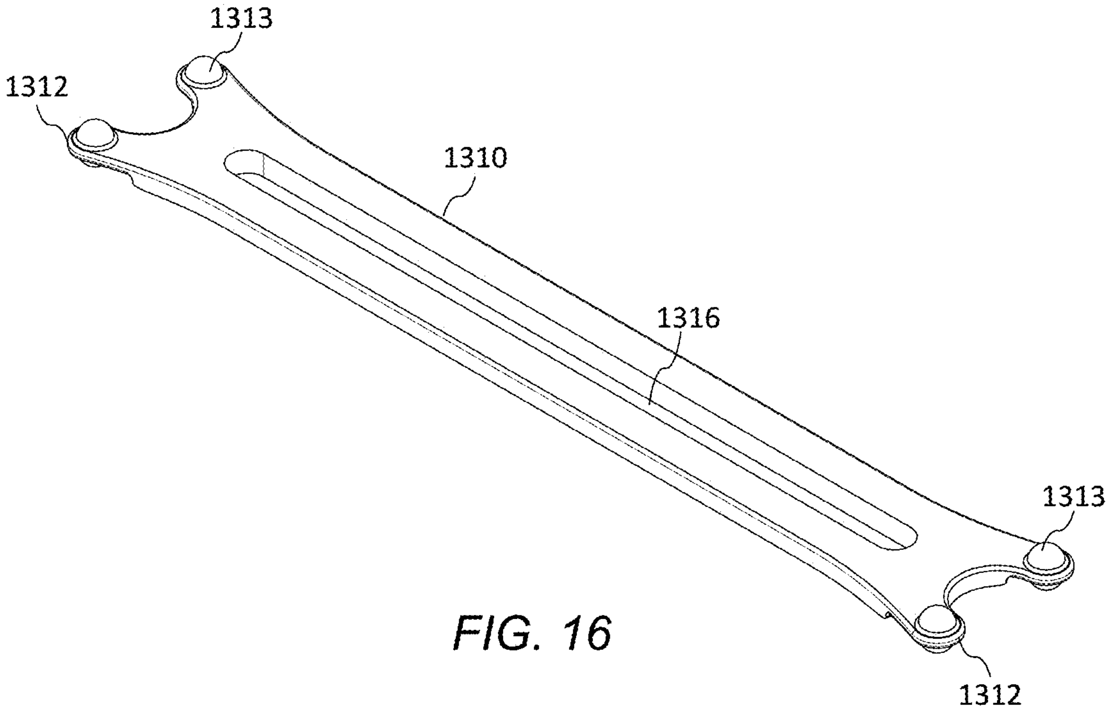

FIG. 16 illustrates a bottom perspective view of a rotating bar of the alignment ring according to an illustrative embodiment.

Figure 17:
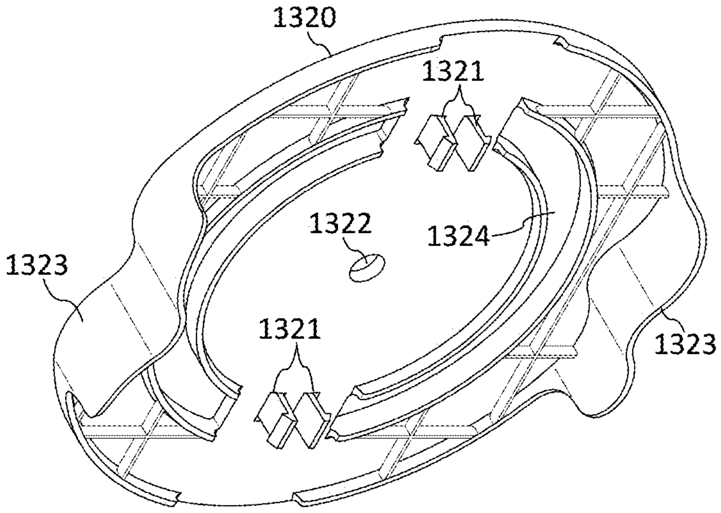

FIG. 17 illustrates a bottom perspective view of a linearly adjustable disc of the alignment ring according to an illustrative embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of device.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 Light Fixture
101 Housing

102 Enclosure
103 Baseplate
104 Adjustable Bracket
105 Lighting Module
106 Trim
107 Light Media Component
108 Heatsink
109 Hanger Bars
110 Ceiling Panel
111 Joists
112 Junction Box
113 Bracket Ring
114 Alignment Ring
114*a-d* Alignment Rings
115 Opening
116 Opening
201 Interior Cavity
203 LED Driver
204 Power Supply
208 Wire and Terminal Block
209 Wire and Terminal Block
212 Power Wires
213 Power Wires
214 Network Wires
215 Network Wires
216 Baffle/Reflector
217 Flange
220 Communication Network
301 Lighting Module Holder
302 Keyed Opening
303 Notch(es)
304 Keyed Locking Member
305 Light Source/LED Engine
306 LED Element(s)/Light Source(s)
307 Locking Tab(s)
308 Slider
309 Rail
310 Arms
311 Locking Mechanism/Screw Nut
312 Locking Mechanism/Screw Nut
313 First Pair of Parallel Rails
315 Second Pair of Parallel Rails
317 Locking Mechanism/Screw Nut
318 Opening
319 Alignment Notches
319*a-d* Alignment Notches
320 Opening
401 Controller
402 Memory
403 Short Range Wireless Interface
405 Communication Network Interface
406 LED Driving Circuit
407 Actuator(s)
500 Laser(s)
501 Alignment Line
502 Alignment Line
601 Hole Saw
705*a* 4" Lighting Module
705*b* 3" Lighting Module
705*c* 2" Lighting Module
709*a* Round 4" Trim
709*b* Round 3" Trim
709*c* Round 2" Trim
709*d* Square 4" Trim
709*e* Square 3" Trim
709*f* Square 2" Trim
714*a* Round 4" Alignment Ring

**714*b*** Round 3" Alignment Ring
**714*c*** Round 2" Alignment Ring
**714*d*** Square 4" Alignment Ring
**714*e*** Square 3" Alignment Ring
**714*f*** Square 2" Alignment Ring
800 Light Fixture
801 Housing
803 Baseplate
804 Adjustable Bracket
805 Gear Ring
806 Linear Gear Rail
807 Inner bracket Ring
809 Ball Bearings
810 Ceiling Panel
813 Bracket Ring
900 Control Device/Wireless Communication Device
1001 Controller
1002 Memory
1004 Power Supply
1003 Short Range Wireless Interface
1005 Communication Network Interfaces
1007 User Interface
1010 Setup Application
1100 Light Fixture
1101 Housing
1103 Baseplate
1104 Adjustable Bracket
1105 Gear Ring
1106 Linear Gear Rail
1107 Inner bracket Ring
1109 Ball Bearings
1110 Ceiling Panel
1112 Worm Gear
1113 Bracket Ring
1114 Motor
1200 Light Fixture
1201 Housing
1203 Baseplate
1204 Adjustable Bracket
1210 Ceiling Panel
1211 First Actuator
1212 Pair of Second Actuators
1213 Bracket Ring
1214 First Linear Worm Gear
1215 Pair of Second Linear Worm Gears
1300 Alignment Ring
1301 First Ring Portion
1302 Second Ring Portion
1303 Countersink Recesses
**1304*a-b*** Snap-Fit Joints
1305 Screws
1306 Magnets
1307 Top Surface
**1308*a*** Inner Annular Wall
**1308*b*** Outer Annular Wall
1309 Annular Channel
1310 Rotating Bar
1311 Opening
1312 Feet
1313 Protrusions
1314 Flanges
1315 Flanges
1316 Linear Channel
1317 Annular Slit
1320 Linearly Adjustable Disc
1321 Fasteners
1322 Central Hole
1323 Handles
1324 Tracing Slits
1330 Bracket Ring
1331 Magnets
1340 Ceiling Panel
1341 Ceiling Opening

LIST OF ACRONYMS USED IN THE SPECIFICATION IN ALPHABETICAL ORDER

The following is a list of the acronyms used in the specification in alphabetical order.

AC Alternating Current
ASIC Application Specific Integrated Circuit
AV Audiovisual
COM Communication
DC Direct Current
IR Infrared
K Kelvin
LED Light Emitting Diode
NFC Near-Field Communication
PoE Power-over-Ethernet
PWM Pulse Width Modulation
RAM Random-Access Memory
RF Radio Frequency
RGB Red-Green-Blue
RISC Reduced Instruction Set Computer
ROM Read-Only Memory
USB Universal Serial Bus
WPAN Wireless Personal Area Network

MODE(S) FOR CARRYING OUT THE INVENTION

The present embodiments provide systems, methods, and modes for recessed light fixtures, and more specifically to systems, methods, and modes for a modular recessed light fixture as well as to systems, methods, and modes for mounting and aligning recessed light fixtures. The recessed light fixture of the present embodiments comprises a modular configuration allowing a single fixture housing to be used for different installations irrespective of the size and shape of the desired lighting assembly and ceiling opening. Additionally, the recessed light fixture of the present embodiments is adjustable via an alignment tool that allows installers to find the fixture's openings through the ceiling panel after installation of the housing, align a plurality of fixtures installed in the space, and also as a guide to cut an opening through the ceiling panel and the housing at the desired location. While the mounting and aligning systems, methods, and modes are described with reference to light fixtures, the aspects of the present embodiments may be implemented to mount other types of electrical equipment recessed in the ceiling, including audiovisual (AV) equipment such as speakers and cameras, recessed sensors (such as to measure occupancy, light, or other environmental conditions), recessed networking equipment, or other equipment desired to be installed in the ceiling. Accordingly, the lighting module 105 described herein, may instead comprise other electronic equipment discussed above capable of cooperating with adjustable bracket 104, being installed in housing 101, and/or be used with alignment ring 114 as discussed in the present embodiments.

Referring to FIGS. 1-3, FIG. 1 illustrates a perspective view of a recessed light fixture 100 installed in the ceiling, FIG. 2 illustrates an exploded perspective view of the recessed light fixture 100, and FIG. 3 illustrates an exploded perspective view of a portion of mechanical and electrical components of the recessed light fixture 100. Recessed light fixture 100 may generally comprise a housing 101, an adjustable bracket 104, a lighting module 105, an LED driver 203, a power supply 204, and a trim 106. Although the light fixture 100 may comprise different configurations and/or components known in the art. Housing 101 may comprise an enclosure 102 covered by a housing baseplate 103 that in cooperation house the mechanical and electrical components of the recessed light fixture 100. Although according to another embodiment, housing 101 may be made from a single body. Housing 101 may comprise an interior cavity 201 that may be substantially insulated from the outside environment. Housing enclosure 102 may comprise material suitable for insulated, non-insulated, and Chicago plenum installations, such as metal material or any other material known in the art. Housing baseplate 103 may comprise material that is also suitable for the above installations, but which can also be easily cut to accommodate various opening sizes and shapes as discussed below. According to various embodiments, housing baseplate 103 may comprise plastic material (e.g., thermoplastic polymers, polyesters, polyamides, polycarbonates, elastomers, plastic blends, or the like), fiberglass, a composite material, or the like. Another benefit of using a baseplate 103 made of such materials, such as plastic versus metal, is the reduction of interference of wireless transmission from a wireless interface of the light fixture 100 through housing 101 and the ceiling panel 110. An opening 116 may be created in the housing baseplate 103, as discussed below, through which the interior cavity 201 can be accessed and through which light exits the housing 101. Housing 101 can also comprise a plurality of adjustable hanger bars 109 used to mount the light fixture 100 to ceiling joists via prongs, screws, nails, or the like, and any combinations thereof.

The adjustable bracket 104 may be adapted to removably retain the lighting module 105 and adjust it in a single direction or in multiple directions. For example, the adjustable bracket 104 may adjust the lighting module 105 horizontally along the x or y axes, or vertically along the z axis. The adjustable bracket 104 may be further configured to adjust the lighting module 105 in a plurality of directions, including dual-axis adjustment (e.g., x-y, x-z, or y-z axes), triple-axis adjustment (e.g., x-y-z axes), and/or rotational adjustment (e.g., about x, y, and/or z axis) as further discussed below.

The lighting module 105 may comprise a light source adapted to emit one or a plurality of colors. The light source may comprise an LED engine 305 that comprises one or more light sources or LED elements 306 disposed on a printed circuit board. The LED engine 305 may be electrically connected to the LED driver 203 using wires and terminal blocks 208 and 209. The LED driver 203 may independently control and power the LED elements of the LED engine 305 to emit light. According to one embodiment, each light source 305 may comprise a multicolored light emitting diode (LED), such as a red-green-blue LED (RGB LED), comprising of red, green, and blue LED emitters in a single package. Although the LED elements 306 can comprise other color combinations of LED emitters, and/or can also comprise one or more white emitters. According to an embodiment, each LED emitter of each LED element 306 can be controlled using pulse width modulation (PWM) signal with a constant current LED driver with output values ranging between 0 and 65535 for a 16-bit channel—with 0 meaning fully off and 65535 meaning fully on. Varying these PWM values of each of the red, green, and blue LED emitters on each LED element 306 allows the LED element 306 to create any desired color within the device's color gamut, including any desired color temperature of white within a range of between about 1650 Kelvin (K) (warm colors) and about 8000K (cool colors), although other color temperature ranges may be achieved. Each LED emitter can be independently controlled at a different intensity. The present embodiments can also be implemented with LEDs capable of producing only a single or a limited number of colors. Furthermore, the present embodiments can be implemented with LEDs that can emit different color temperatures of white, such as tunable white LEDs, dim to warm LEDs, or LEDs with a plurality of predetermined color temperature settings. To vary color temperatures, the LEDs may comprise a plurality of white LEDs or white LED emitters with varying white color temperatures where mixing these LEDs can produce a desired color temperature. Although according to another embodiment, the light source 305 may comprise different technology currently known or later developed, such as incandescent, xenon, halogen, fluorescent, or the like.

Lighting module 105 may further comprise a heatsink 108 adapted to be in thermal conductive contact with the LED engine 305 to dissipate heat away from and cool the electrical components of the light fixture 100. This improves the efficiency and prolongs the life of the internal electronics of the light fixture 100. According to one embodiment, the heatsink 108 may be part of the lighting module 105, although according to another embodiment the heatsink 108 may be part of the adjustable bracket 104 such that the lighting module 105 can be removably attached to the heatsink 108. An additional heatsink can be used for heat dissipation of the LED driver 203 and/or power supply 204. Heatsink 108 can comprise a plurality of fins to maximize its surface area and effectively dissipate heat. In various embodiments, the heatsink 108 comprises aluminum, aluminum alloy, copper, magnesium, manganese, silicon, tin, zinc, composite materials, any combinations thereof, or other materials known to those skilled in the art.

The lighting module 105 may also comprise a light media component 107 disposed over, and non-removably or removably attached, to the LED engine 305. The light media component 107 may comprise one or more optics, lenses, light diffusers, or the like. Optics or lenses can be used to affect the beam spread or angle and the lumen output of the light source to either concentrate the light in a smaller area or distribute it across a larger area. For example, a 35° optic can be used to provide a narrower beam spread to concentrate light in a smaller area while a 55° optic can be used to provide a wider beam spread to distribute light across a larger area. Other forms of light media components 107 can be provided for diffusion, elongating, softening, honeycomb, frosted, and perimeter frosted effects. For example, a light diffuser can comprise a decorative optic made from glass material that can be frosted to create diffused or soften light or textured with a pattern to reduce light glare. Although other materials may be utilized, such as plastic, fiberglass, or the like. In another embodiment, a light media component 107 can comprise a grid, such as a honeycomb grid or a parabolic louver, to reduce glare and create diffused light.

The LED driver 203 may be connected to a power supply 204 to receive power from a power source through power wires 212. Light fixture can be connected, such as through a daisy chain connection, to provide power to other light fixtures, for example through power wires 213. According to an embodiment, housing 101 may comprise a junction box

112 that houses the power supply 204 and any electrical connections that need to be made with the power source or other light fixtures in isolation from the housing enclosure 102. The LED driver 203 may be positioned within the housing enclosure 102 and electrically connected to the power supply 204 via an opening between the housing enclosure 102 and the junction box 112. The LED driver 203 may be further connected to a communication network 220 through network wires 214 and daisy chained with other fixtures through network wires 215. According to another embodiment, the LED driver 203 may communicate over a wireless communication network as further discussed below. The location of the LED driver 203 and power supply 204 are not limited to the configuration shown in FIG. 2 and may be otherwise positioned with respect to housing 101. The LED driver 203 and/or power supply 204 may be also integrated with the lighting module 105.

The trim 106 may comprise a baffle or a reflector 216 and a flange 217, although the trim 106 may be provided without a flange 217 or the flange 217 may be removable. The trim 106 is the decorative part of the light fixture 100 that covers the hole cut in the ceiling panel 110 as well as the gap between the lighting module 105 and the ceiling panel 110. The baffle 216 may be used to direct light to a desired direction, depending on its shape and angle. The trim 106 can comprise a round, square, cone, or other shape. The trim 106 may also be covered with a clear or frosted lens, such as a glass or plastic, for example for use in wet installation locations.

Referring to FIG. 4 there is shown an illustrative block diagram of the electrical components of the light fixture 100 comprising the LED driver 203, power supply 204, and LED engine 305. According to an embodiment, light fixture 100 can further comprise one or more actuators 407 to facilitate movement of the adjustable bracket 104 as discussed below. The LED driver 203 is electrically connected to and regulates the power supplied to the LED engine 305. The LED driver 203 can control the operation of the LED engine 305 in a variety of ways, including, but not limited to, turning the LED engine 305 on and off, dimming, incremental dimming, such as a high-medium-low operation, and adjusting the color of the light output, including color temperature adjustment or full color control, or the like. The LED driver 203 may comprise a controller 401, memory 402, LED driving circuit 406, short range wireless interface 403, communication network interface 405, as well as other components known in the art, such as sensors.

The power supply 204 may be either external to the LED driver 203 as shown in FIG. 2, or it may be packaged in the same package as the LED driver 203. Power supply 204 provides power to the various circuit components of the light fixture 100 and for regulating voltage. According to an embodiment, the power supply 204 may be connected to a direct current (DC) voltage power source or an alternating current (AC) mains power source and may convert the AC signal to a direct current (DC). In yet another embodiment, light fixture 100 may receive both power and data signals (to the communication network interface 405) using Power-over-Ethernet (POE) or via a Cresnet® port. However, other types of connections or ports may be utilized.

Controller 401 may comprise one or more microprocessors, "general purpose" microprocessors, a combination of general and special purpose microprocessors, application specific integrated circuits (ASIC), one or more reduced instruction set computer (RISC) processors, video processors, related chip sets, or the like, or any combinations thereof. The controller 401 can provide processing capability to execute an operating system, run various applications, and/or provide processing for one or more of the techniques and functions described herein. The memory 402 may be communicably coupled to the controller 401 and can store data and executable code. Memory 402 can represent volatile memory such as random-access memory (RAM), but can also include nonvolatile memory, such as read-only memory (ROM) or Flash memory. In buffering or caching data related to operations of the controller 401, memory 402 can store data associated with applications running on the controller 401.

The LED driver 203 may comprise one or more LED driving circuits 406 controlled by the controller 401 to output one or more drive signals to one or more LED engines 305 to perform a desired function as discussed above. Each drive signal can comprise a PWM signal or a similar signal, which drives the individual LED emitters of each LED element 306 of the LED engine 305.

The LED driver 203 can further comprise one or more communication network interfaces 405, such as a wired or a wireless communication interface, configured for transmitting and/or receiving messages over a communication network 220. In various embodiments, LED driver 203 can transmit and/or receive messages from a central controller, other light fixtures, electrical control devices, a wireless user communication device, or the like, or any combinations thereof. For example, a plurality of LED fixtures 100 can be connected over the communication network 220 to a control processor of a lighting or building control system, which is adapted to individually address and control the LED fixtures installed in a room or a building. According to another embodiment, a central control processor may not be used and the plurality of LED fixtures 100 can be interconnected over the communication network 220 to exchange commands and messages. According to yet another embodiment, the LED fixture 100 can be connected to a light switch or a keypad located in the room. Messages sent or received by the light fixture 100 via the communication network interface 405 may comprise control commands, firmware update information, device discovery information, device commissioning information, feedback or status information, such as reporting of lamp hours, lamp state, firmware version, estimated power consumption, or the like, or any combinations thereof. A wireless network interface 405 may be configured for bidirectional wireless communication with other electronic devices over a wireless network. In various embodiments, the wireless interface can comprise a radio frequency (RF) transceiver, an infrared (IR) transceiver, or other communication technologies known to those skilled in the art. A wired communication interface 405 may be configured for bidirectional communication with other devices over a wired network. The wired interface can represent, for example, a communication (COM) port, a universal serial bus (USB) port, a Cresnet® port, an Ethernet port (e.g., RJ-45), DMX port, DALI®, 0-10V low voltage dimming port, RGBW control ports, or the like. In various aspects of the embodiments, the LED driver 203 can both receive the electric power signal and control commands through a PoE interface.

Communication network 220 may comprise a wired or a wireless network. In one embodiment, a wired communication network 220 can be implemented using bus wiring and serial ports, as discussed above. A wired communication network 220 may be governed by a standard or proprietary wired communication protocols, such as Cresnet®, DMX (e.g., DMX512), DALI®, 0-10V, RGBW, or other protocols known in the art. In another embodiment, a wireless communication network 220 can comprise one or more wireless personal area networks (WPAN). Communication protocols govern the operation of the wireless network 220 by governing network formation, communication, interferences, and other operational characteristics. A wireless communication network 220 may be governed by a standard or proprietary communication protocols, such as infiNET EX®, ZigBee®, Wi-Fi®, Z-Wave®, or other protocols known in the art. In an embodiment, the wireless network 220 is automatically formed upon installation during a wireless network initialization process. Many of the configuration properties for forming the wireless network 220 can be preconfigured prior to initialization. The communication network can also implement one or more intermediary device such as gateways, splitters, wireless hubs, or similar devices.

In yet another embodiment, the LED driver 203 can comprise a second network interface, such as a short range wireless interface 403, to enable wireless communication with proximately located wireless devices, such as a wireless communication device 900 (FIG. 9), e.g., a smartphone or a tablet, a portable computer, or other portable electronic devices known in the art. Short range wireless interface 403 may comprise an IR interface or a RF interface, such as a Bluetooth wireless interface, a near-field communication (NFC) interface, or other communications known in the art.

Referring to FIG. 3, according to an embodiment, adjustable bracket 104 may comprise a lighting module holder 301 adapted to removably receive the lighting module 105. According to an embodiment, lighting module holder 301 may comprise a keyed opening 302 comprising one or more notches 303. Lighting module 105 may comprise a complementary keyed locking member 304 comprising locking tabs 307. Keyed locking member 304 is adapted to fit within the keyed opening 302 by aligning the locking tabs 307 with the notches 303 and locking the lighting module 105 in place with respect to the lighting module holder 301 by twisting the lighting module 105 and thereby the locking member 304. Although other interlocking mechanisms known in the art may be provided for removably attaching the lighting module 105 with the lighting module holder 301, such as clips, screws, snap-fits, or the like. According to one embodiment, heatsink 108 may be part of the lighting module 105 such that it can be removed together with the lighting module 105. Accordingly, an appropriately sized heatsink 108 may be used with respect to the selected LED engine size and/or specification such that the light fixture 100 can accept variously sized lighting module 105 desired for the installation. Although according to another embodiment, the heatsink 108 may be attached to the lighting module holder 301 and not part of the lighting module 105 such that only the LED engine 305 together with the light media component 107 may be removed. In such an implementation, the keyed locking member 304 may be directly connected to the LED engine 305. In any one of the above implementations, the light fixture 100 is configured such that variously sized lighting assemblies 105 may be selected and used with the same housing 101. For example, lighting assemblies 105 of various sizes, as shown in FIG. 7, can be selected to correspond to the desired ceiling opening size, such as 1", 2", 3", 4", or 6" opening sizes—although other sizes may be implemented. Larger openings may accommodate larger lighting assemblies 105 with larger LED engine 305 and thereby with higher level of lighting intensity, for example for providing distributed lighting for substantially equal ambiance. Smaller openings may accommodate smaller lighting assemblies 105 for spotlighting or similar effects.

Adjustable bracket 104 may further comprise a bracket ring 113 connected to the lighting module holder 301 via a pair of arms 310, which may be adjustable or fixed. According to one embodiment, the lighting module holder 301 may be vertically adjustable along the z axis with respect to the housing baseplate 103, for example via a pair of arms 310, that may comprise slide rails or other mechanism, such as telescoping, pneumatic, or the like. For example, each arm 310 may comprise a slider 308 connected to the lighting module holder 301 and adapted to linearly and vertically slide within a respective rail 309. Each arm 310 may further comprise a locking mechanism such as a screw nut 311, for selectively securing the vertical position of the lighting module holder 301 by locking the slider 308 with respect to the rail 309. Vertical adjustment allows the lighting module holder 301 to receive lighting assemblies 105 of various sizes and/or to vertically adjust the lighting module 105 with respect to a ceiling panel 110, such as drywall, wood, ceiling tiles, or the like, to accommodate different ceiling panel thicknesses, such as ½ inch, ⅝ inch, or other thickness used in the installation as discussed below. Although according to another embodiment, the lighting module holder 301 can be vertically fixed with respect to the housing 101 via the arms 310.

Bracket ring 113 comprises an opening 318 through which the lighting module 105 may be inserted into the adjustable bracket 104 to be connected to the lighting module holder 301, and through which light exits the adjustable bracket 104. According to an embodiment, lighting module holder 301 together with arms 310 may pivot about the y axis with respect to the bracket ring 113, for example via a screw nut 312, such that the angle of an attached lighting module 105 may be adjusted from 0° to about 45° of tilt to direct the emitted light to a desired vertical location, for example to provide spot lighting or wall wash effect. The pivot position of the adjustable bracket 104 may be locked in place using a locking mechanism, such as the screw nut 312. Although other pivoting mechanisms or assemblies may be utilized, or the lighting module holder 301 may be fixedly connected with respect to the bracket ring 113. According to another embodiment, lighting module holder 301 may be configured to rotate with respect to the bracket ring 113 about the z axis from 0° to 360° of rotation, via for example a ring gear, ball bearing, or the like (e.g., 809 in FIGS. 8 and 1109 in FIG. 11), such that the horizontal rotational position of the attached lighting module 105 and thereby the emitted light may be horizontally and rotationally adjusted.

The adjustable bracket 104 may be further slidably disposed between a first pair of parallel rails 313 such that the adjustable bracket 104 may be slidably adjusted along the first pair of rails 313 along the horizontal x axis with respect to the housing baseplate 103. The horizontal x axis position of the adjustable bracket 104 may be locked in place using a locking mechanism such as the screw nut 312 or another screw nut. The first pair of rails 313 may in turn be slidably disposed between a second pair of parallel rails 315 such that the adjustable bracket 104 may be slidably adjusted along the horizontal y axis with respect to the second pair of rails 315. The horizontal y axis position of the adjustable bracket 104 may be locked in place using a locking mechanism such as a screw nut 317. Although according to another embodiment only the first pair of rails 313 may be provided for adjustment along only the horizontal x axis or the y axis.

According to other embodiments, other number of rails or other mechanisms may be utilized to implement horizontal adjustment of the adjustable bracket 104 along the x and/or y axes, such as via linear gears, worm gears, telescoping arms, pneumatic arms, rod rails, threaded rods and nuts, or the like.

Bracket ring 113 can entirely or partially comprise metallic and/or magnetic material adapted to magnetically attach to a complementarily sized alignment ring 114 through the ceiling panel 110 as shown in FIG. 6A and discussed below. Alignment ring 114 may entirely or partially comprise a metallic and/or magnetic material adapted to attach to the bracket ring 113. The bottom attachment surface of the alignment ring 114 may be sized and shaped to complement the top attachment surface of the bracket ring 113. Alignment ring 114 can comprise an opening 320 of either the same or smaller size than opening 318 in the bracket ring 113, depending on the desired ceiling opening that needs to be made. Alignment ring 114 is used to align a plurality of light fixtures 100 after they are installed in the ceiling and also as a guide for making openings in the ceiling panel 110 as well as the housing baseplate 103 as discussed below. Alignment ring 114 may further comprise a plurality of alignment notches 319, for example four alignment notches 319 disposed at right angles with respect to each other, to assist with alignment as discussed below. Although fewer or additional alignment notches may be implemented.

Referring to FIG. 1 and FIG. 6A, light fixture 100 may be installed in the ceiling between joists or beams 111, or other building structure, before the ceiling panel 110 is installed. Particularly, the housing 101 may be positioned between the joists 111 and the hanger bars 109 may be extended and aligned to abut the bottom edge of the opposing joists 111. The hanger bars 109 may be secured to the joists 111 using screws or other mounting implements discussed above. Housing 101 may then be aligned by sliding the housing along the hanger bars 109 to a desired position with respect to other lighting fixtures installed in the space. To prevent the housing 101 from moving, screws may be provided to secure the hanger bars 109 to the housing 101. During installation between the joists, the lighting module 105 may removed from the housing 101 while the housing baseplate 103 may not contain any openings such that it entirely covers the interior cavity 201 of the housing 101, preventing dust or debris from entering during installation. According to an embodiment, the bracket ring 113 may be further covered by a removable insert for further protection. Power and network connections can then be made via wire leads 212-215 and connectors and/or ports within the junction box 112. Ceiling panel 110 can then be installed over the housing 101. The ceiling may then be finished and painted, if desired.

To further align a plurality of fixtures 100 in a room, one or more alignment rings 114 may be attached to the bracket rings 113 of the installed light fixtures 100 through the ceiling panel 110 as shown in FIG. 6A. Alignment rings 114 further assist in locating the openings 318 of the adjustable bracket 104 from which the light will exit. FIG. 5 illustrates a bottom view of a plurality of installed light fixtures 100 to be adjusted according to an illustrative embodiment. One or more lasers 500 may be used to assist with alignment of the alignment rings 114 via emitted alignment or laser lines 501 and 502, for example along the x and y axes, respectively. Although other alignment mechanisms can be used, such as strings, tape, or other markings. As discussed above, alignment rings 114 can be provided with notches 319 to facilitate alignment, for example by aligning two opposing notches 319*a*-*b* with alignment line 501, and the other two opposing notches 319*c*-*d* with alignment line 502. Notches 319*a*-*d* may further comprise reflective or fluorescent center or indicators adapted to amplify laser lines. Prior to cutting the ceiling panel 110, if it is found that an alignment ring 114 is misaligned, the misaligned ring 114 can be shifted by hand to an aligned position, thereby also shifting the magnetically attached adjustable bracket 104 within the housing 101 via rails 313 and/or rails 315. For example, alignment ring 114*b* may be adjusted along the y axis to align with alignment line 501 and alignment ring 114*c* may be adjusted along the x axis to align with alignment line 502. Although a plurality of alignment rings 114 are shown in FIG. 5, a single alignment ring 114 may be used to align a plurality of openings by cutting openings one at the time, or marking the openings before being cut.

FIGS. 6A-6C illustrate exemplary steps of cutting openings in the ceiling panel 110 and the baseplate 103 of the housing 101 via the alignment ring 114 after the alignment ring 114, and thereby adjustable bracket 104, are adjusted to a desired position. Referring to FIG. 6A, the alignment ring 114 further provides a guide for cutting through the ceiling panel 110 as well as through the baseplate 103. The alignment ring 114 can comprise an opening 320 corresponding to the desired hole size for the desired sized lighting module 105 and complementary trim 106. A hole saw 601 or similar tool that corresponds to the desired hole size may be inserted into the opening 320 of the alignment ring 114 and powered to create an opening 115 in the ceiling panel 110 and opening 116 in the housing baseplate 103 as shown in FIG. 6B. As shown in FIG. 6C, the alignment ring 114 may then be removed, and lighting module 105 may then be inserted through the openings 116 and 115 and connected to the adjustable bracket 104 by twisting the lighting module 105 as discussed above. Depending on the size of the lighting module 105 and the thickness of the ceiling panel 110, the lighting module 105 may be vertically adjusted using the arms 310 to a desired position as discussed above. The lighting module 105 can also be tilted and/or adjusted rotationally, if desired, using the adjustable bracket 104 as discussed above. Finally, the trim 106 may be secured to direct light and substantially cover any gaps between the ceiling panel 110 and the lighting module 105 as shown in FIG. 6C.

To accommodate different opening sizes and shapes, a plurality of alignment rings can be provided with different openings sizes and shapes, for example as illustrated in FIG. 7. As an example, the plurality of alignment rings may comprise a 4" round alignment ring 714*a*, a 3" round alignment ring 714*b*, and a 2" round alignment ring 714*c* to accommodate corresponding 2", 3", and 4" round trims 709*a*, 709*b*, and 709*c* and lighting modules 705*a*, 705*b*, and 705*c*, respectively, as well as a 4" square alignment ring 714*d*, a 3" square alignment ring 714*e*, and a 2" square alignment ring 714*f* to accommodate corresponding square trims 709*d*, 709*e*, and 709*f*, and lighting modules 705*a*, 705*b*, and 705*c* respectively. The metallic or magnetic material disposed on the alignment rings 114/714*a*-*f* may comprise a size and shape that corresponds to the size and shape of the bracket ring 113 such that the alignment rings 714*a*-*f*, irrespective of their opening size or shape, can align with and attach to the same sized bracket ring 113 in the lighting fixture 100, preferably also allowing the alignment ring 114/714*a*-*f* to rotate with respect to the bracket ring 113. According to another embodiment, a single sized alignment ring 714*a* may be used that can receive various inserts with variously sized and/or shaped alignment openings, which can be inserted into and attached to the alignment ring 714*a*.

According to an embodiment, the same shaped lighting modules 705*a-c* may be used for variously sized ceiling openings and trims, although according to another embodiment, lighting modules can be made of other shapes, such as square lighting modules with square LED engine 305. In addition, other opening sizes and shapes may be implemented using the present embodiments. Since various sized and shaped openings can be cut into the baseplate 103 of the housing 101, the same housing 101 can support different sized and shaped lighting modules 105, allowing for a modular implementation. This provides a more efficient and organized way to warehouse light fixtures 100 with a single housing 101 and a plurality of lighting module 105 sizes and/or shapes, eliminating the need to store a plurality of different housing types for each sized and shaped opening.

Referring to FIGS. 13 through 15, there is shown a bottom perspective view, a top perspective view, and a top exploded perspective view of an alignment ring 1300, respectively, according to another embodiment. Alignment ring 1300 may comprise a first ring portion 1301, a second ring portion 1302, a rotating bar 1310, and a linearly adjustable disc 1320. First and second portions 1301 and 1302 assemble together to form the alignment ring 1300 with an opening 1311 therethrough. First portion 1301 may connect to the second portion 1302 via a variety of ways, such as via friction fit, threads, grooves, fasteners, or the like. For example, screws 1305 and/or snap-fit joints 1304*a* and 1304*b*, such as cantilever snap fit joints, may be used. Although according to another embodiment, alignment ring 1300 may comprise a single body. Alignment ring 1300 is sized to correspond to the size of the bracket ring 1330 within the light fixture 100 (e.g., FIG. 3). Alignment ring 1300 may comprise a plurality of countersink recesses 1303 each adapted to receive magnets 1306, which may be secured to the alignment ring 1300 with screws 1305, glue, or the like. In such an implementation, alignment ring 1300 may be made from a non-magnetic material. The bracket ring 1330 may similarly comprise a plurality of magnets 1331 correspondingly arranged on the bracket ring 1330 to attach to magnets 306 through a ceiling panel 1340, or the bracket ring 113 may comprise corresponding magnetic metal elements or be entirely or partially made from a magnetic metal material. According to another embodiment, the top surface 1307 of the second portion 1302 may entirely or partially comprise a magnetic material, such as magnet or metallic strips, or the second portion 1302 may be made of metal.

Alignment ring 1300 may further comprise an annular channel 1309 disposed between an inner annular wall 1308*a* and an outer annular wall 1308*b*. Annular channel 1309 may be formed in the first portion 1301, in the second portion 1302, or in both first and second portions 1301 and 1302, and is completed once the first portion 1301 attaches to the second portion 1302. When assembled, the opening 1311 of the alignment ring 1300 comprises an annular slit 1317 formed along the opening 1311. Referring also to FIG. 16, there is shown a bottom view of the rotating bar 1310. Rotating bar 1310 may comprise a plurality of feet 1312 extending from its opposite ends, and adapted to fit through the annular slit 1317. According to an embodiment, each end of the rotating bar 1310 may comprise a pair of feet 1312. Each foot 1312 may comprise a pair of protrusions 1313 extending from its opposite surfaces. Although according to another embodiment, each foot 1312 may comprise bearing balls 1313. Protrusions 1312 are adapted to be captured and annularly travel within the annular channel 1309 between the inner and outer annular walls 1308*a-b* such that the rotating bar 1310 can rotate with respect to the alignment ring 1300 in direction D1 (FIG. 14). Rotating bar 1310 may further comprise a plurality of flanges 1314 and 1315 disposed on opposites sides of the feet 1312 and adapted to abut against the inner annular wall 1308*a*, external to the channel 1309, such that the rotating bar 1310 is maintained central to the diameter of the alignment ring 1300 while being rotated.

Rotating bar 1310 further comprises a linear channel 1316 longitudinally extending through its body between the oppositely disposed feet 1312. Referring also to FIG. 17, which shows a bottom perspective view of the disc 1320, disc 1320 comprises a plurality of fasteners 1321, such as cantilever snap fits, adapted to engage the linear channel 1316 in the rotating bar 1310 such that the disc 1320 may linearly travel along the rotating bar 1310 in direction D2. Disc 1320 may further comprise a central hole 1322 that can be used for marking the center of an opening 1341 in the ceiling panel 1340 for a hole cutting drill bit. Disc 1320 may also or alternatively include annular or partially tracing slits 1324 allowing a user to trace an outline for the required sized ceiling opening 1341. One or more sets of tracing slits may be included on the disc 1320 for marking variously sized openings 1341, depending on the size and function of the lighting module 105. Disc 1320 may further implement a pair of handles 1323 adapted to assist the user to grip the disc 1320 and manipulate its movement. Alignment ring 1300 may further comprise laser markings, for example on the outer surface of the first portion 1301 to assist with alignment as discussed above.

After installing the light fixture 100 in the ceiling, and covering the ceiling with a ceiling panel 1340, such as drywall, the top surface 1307 of the alignment ring 1300 may be placed against the ceiling panel 1341 and moved until it is attracted to and attaches to the bracket ring 1330 of the light fixture through the ceiling panel 1340. This allows the user to preemptively locate bracket ring 1330 of the light fixture 100. By gripping handles 1323, the disc 1320 may be manipulated by the user, by either rotating the disc 1320 via the rotating bar 1310 with respect to the alignment ring 1300, and/or by sliding the disc 1320 linearly along the bar 1310. Accordingly, disc 1320 may be laterally or horizontally adjusted along the x or y axis within the alignment ring 1300 if an opening adjustment is necessary due to installation errors. The user may manipulate the disc 1320 to a desired location in alignment with openings of other light fixtures in the room in a similar fashion as discussed with reference to FIG. 5 above. After determining the desired location for the light fixture opening 1341, the user may mark the center of the opening 1341 using hole 1322, for example if the user is using a hole cutting drill bit; or mark the outline of the opening 1341 using tracing slits 1324 in the disc 1320, depending on the desired fixture opening size, for example if the user is using a hole or rotor saw. Alignment ring 1300 can then be removed, and the user can cut an opening 1341 through the ceiling panel 1340, as well as in an opening 116 through the housing baseplate 103 as discussed above. The light module 105 can then be installed, and if the housing 101 allows for adjustability, adjusted within the housing 105 to be centered with the cut openings 1341 and 116 (FIG. 1). Alignment ring 1300 can then be reused multiple times for installation purposes.

FIG. 8 illustrates a top partial view of another embodiment of an adjustable bracket 804 of a light fixture 800 adapted to be adjusted in the horizontal y axis (or x axis). Adjustable bracket 804 can be configured to retain a lighting module 105 within the housing 801 as discussed above.

Adjustable bracket 804 can comprise a bracket ring 813 comprising a gear ring 805 with teeth that rotationally travels along the teeth of a linear gear rail 806. After installation of the housing 801 and the ceiling panel 810 in the ceiling, an alignment ring 114, as discussed above, may be magnetically attached to the bracket ring 813 through the ceiling panel 810. To adjust the adjustable bracket 804, the alignment ring 114 can be rotated by hand in either clockwise or counterclockwise direction, depending on the desired direction of adjustment, thereby rotating the gear ring 805 and causing the adjustable bracket 804 (as well as the attached alignment ring 114) to also travel linearly along the linear gear rail 806 along the y axis. According to another embodiment, bracket ring 813 may further comprise an inner bracket ring 807 rotationally connected to the gear ring 805 via ball bearings 809 therebetween, or the like, such that gear ring 805 can be rotated with respect to the inner bracket ring 807. In such an implementation, the alignment ring 114 can be magnetically attached to the inner bracket ring 807 and adjusted by hand linearly along the y axis, causing the gear ring 805 to rotate about the inner bracket ring 807 and move along the linear gear rail 806 along the y axis. Once the adjustable bracket 804 is adjusted to a desired position, an opening can be cut through the ceiling panel 810 and the baseplate 803 as discussed above with reference to FIGS. 6A through 6C. The alignment ring 114 can then be removed, the adjustable bracket 804 can be locked in place using a locking mechanism, the lighting module 105 can be installed and further adjusted, and then the trim 106 can be installed as discussed above.

According to a further embodiment, the adjustable bracket 104 of the light fixture 100 can be electrically adjusted to a desired position via one or more electrical actuators controlled by a control device, such as a wireless communication device 900 shown in FIG. 9. Electrical adjustment can be implemented using one or more electrical actuators 407, such as motorized, pneumatic, or other actuators known in the art. Such actuators can be controlled via the wireless communication device 900 in communication with the LED driver 203 or another controller of the light fixture 100. Although other control devices may be implemented, such as a personal computer, a wall mounted keypad, a control system processor, a proprietary commissioning device, or the like.

Referring to FIG. 10, the control device, such as a wireless communications device 900, may comprise a controller 1001, a memory 1002, a power supply 1004, one or more communication network interfaces 1005, a short range wireless interface 1003, and a user interface 1007. Controller 1001 and memory 1002 may comprise similar configuration as to the controller 401 and memory 402 discussed above. Memory 1002 may store a setup application 1010 that is run by the controller 1001 to send control commands to the light fixture 100 to adjust the adjustable bracket as discussed below. The power supply 1004 may comprise a rechargeable battery. The communication network interface 1005 may be adapted to communicate directly with the light fixture 100 or through a control processor or a control device discussed above via a communication network 220. The short range wireless interface 1003 may comprise a similar configuration to short range wireless interface 403 such that it can communicate with the short range wireless interface 403 of the light fixture 100. The user interface 1007 may comprise one or more of a display screen, touch screen, buttons, keyboard, mouse, or the like, or any combinations thereof.

Referring to FIG. 11, there is shown a top partial view of an adjustable bracket 1104 of a light fixture 1100 adapted to retain a lighting module 105 and be electrically adjusted in the horizontal y axis (or x axis). Adjustable bracket 1104 can comprise a similar configuration to adjustable bracket 804 comprising a bracket ring 1113 having a gear ring 1105 with teeth that rotationally travels along the teeth of the linear gear rail 1106. As discussed above, the alignment ring 114 can be attached to the bracket ring 1113 and adjusted rotationally to move along the y axis, or the bracket ring 1113 may comprise an inner bracket ring 1107 rotationally connected to the gear ring 1105 via ball bearings 1109 therein such that the alignment ring 114 can be moved linearly along the y axis to adjust the adjustable bracket 1104. A worm gear 1112 may be parallelly disposed with respect to the linear gear rail 1106 on the other side of the gear ring 1105. The worm gear 1112 may be connected to an actuator 407, such as a motor 1114 adapted to rotate the worm gear 1112 in clockwise or counterclockwise direction depending on the desired direction of travel of the adjustable bracket 1104 along the y axis. Additional motors may be used to implement horizontal adjustment along the x axis. As the worm gear 1112 rotates by the motor 1114 in a desired rotational direction, it engages the teeth of the gear ring 1105 and causes it to rotate and travel along linear gear rail 1106 in a desired horizontal y axis linear direction. After installation of the housing 1101 and the ceiling panel 1110 in the ceiling, an alignment ring 114 may be magnetically attached to the bracket ring 1113 through the ceiling panel 1110. The installer can then access the setup application 1010 on the wireless communication device 900 to connect to the driver 203 of the light fixture 1100, for example via their respective short range wireless interfaces 1003 and 403 (e.g., via Bluetooth), via network interfaces 1005 and 405, or indirectly through, for example, a control processor. The user can interact with setup application 1010 via the user interface 1007 of the wireless communication device 900 to adjust the position of the adjustable bracket 1104 along the y axis to a desired location. The wireless communication device 900 may in turn transmit control commands to the driver 203 to direct the actuation of the motor 1114 and thereby adjust the adjustable bracket 1104 to a desired location along y axis. The alignment ring 114 may be used as a visual guide to determine the appropriate positioning of the adjustable bracket 1104 with respect to other light fixtures installed in the space as discussed above with reference to FIG. 5. After desired position is determined, the ceiling panel 1110 and the baseplate 1103 can be cut to form openings as discussed above with reference to FIGS. 6A through 6C. The alignment ring 114 can then be removed, the adjustable bracket 1104 can be locked in place using a locking mechanism, the lighting module 105 can be installed and further adjusted, and then the trim 106 can be installed as discussed above.

Referring to FIG. 12, there is shown a top partial view of yet another embodiment of an adjustable bracket 1204 of a light fixture 1200, but which can be electrically adjusted for dual axis positioning, such as in the horizontal x axis and/or horizontal y axis. As discussed above, adjustable bracket 1204 is adapted to retain a lighting module 105 and may comprise a bracket ring 1213 for magnetic attachment to the alignment ring 114. A top end of the adjustable bracket 1204 can be connected to a first actuator 1211, such as a worm gear linear actuator, adapted to linearly travel along a first linear worm gear 1214 along the x axis. The terminal ends of the first linear worm gear 1214 can in turn be connected to a pair of second actuators 1212, such as worm gear linear actuators, adapted to linearly travel along respective pair of second linear worm gears 1215. Pair of second linear worm gears 1215 may be disposed parallel with respect to each other and secured to the housing 1201 on opposite sides of the adjustable bracket 1204. Thereby, adjustable bracket 1204 can travel along the y axis as the first linear worm gear 1214 linearly travels via the pair of second actuators 1212 along respective pair of second linear worm gears 1215. The first actuator 1211 and the pair of second actuators 1212 can be electrically connected to the driver 203. After installation of the housing 1201 and the ceiling panel 1210 in the ceiling, an alignment ring 114 may be magnetically attached to the bracket ring 1213 through the ceiling panel 1210. The installer can then access the setup application 1010 on the wireless communication device 900 to connect to the driver 203 of the light fixture 1200, for example via their respective short range wireless interfaces 1003 and 403 (e.g., via Bluetooth), via network interfaces 1005 and 405, or indirectly through, for example, a control processor. The user can interact with setup application 1010 via the user interface 1007 of the wireless communication device 900 to adjust the position of the adjustable bracket 1204 along the x axis and/or the y axis to a desired location. The wireless communication device 900 may in turn transmit control commands to the driver 203 to direct the actuation of one or more of the actuators 1211 and/or 1212 and thereby adjust the adjustable bracket 1204 to a desired location along x axis and/or y axis. The alignment ring 114 may be used as a visual guide to determine the appropriate positioning of the adjustable bracket 1104 with respect to other light fixtures installed in the space as discussed above with reference to FIG. 5. After desired position is determined, the ceiling panel 1210 and the baseplate 1203 can be cut to form openings as discussed above with reference to FIGS. 6A through 6C. The alignment ring 114 can then be removed, the adjustable bracket 1204 can be locked in place using a locking mechanism, the lighting module 105 can be installed and further adjusted, and then the trim 106 can be installed as discussed above.

The above embodiments for electrical adjustment may be configured with other types of actuators known in the art, such as for example, pneumatic actuators, or the like. In addition, different number of actuators and gears, in different configurations, may be implemented to enable adjustment of the adjustable bracket and thereby the lighting module 105, without departing from the scope of the present embodiments.

INDUSTRIAL APPLICABILITY

The disclosed embodiments provide a system, software, and a method for a modular recessed light fixture and for mounting and aligning recessed light fixtures. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments can be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and can include other examples that occur to those skilled in the art. Such other examples are intended to be within the scope of the claims.

The above described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

Moreover, the processes discussed herein are not meant to limit the aspects of the embodiments, or to suggest that the aspects of the embodiments should be implemented following the configuration process. The purpose of the processes is to facilitate the understanding of one or more aspects of the embodiments and to provide the reader with one or many possible implementations of the process discussed herein. The steps performed during any of the processes are not intended to completely describe the process but only to illustrate some of the aspects discussed above. It should be understood by one of ordinary skill in the art that the steps may be performed in a different order, additional steps may be added, and that some steps may be eliminated or substituted.

What is claimed is:

1. A light fixture assembly comprising:

a housing that supports a lighting module and a bracket ring comprising an opening, wherein the housing is adapted to be installed in a ceiling behind a first side of a ceiling panel such that the ceiling panel covers the bracket ring opening; and a removable alignment ring adapted to magnetically attach to the bracket ring through and on a second side opposite the first side of the ceiling panel to locate the bracket ring, wherein the alignment ring comprises an adjustment mechanism that is laterally adjusted within the alignment ring to a desired position, wherein the alignment ring comprises a guide for indicating the desired position of an opening to be created in the ceiling panel;

wherein after indicating the desired position of the ceiling panel opening, the alignment ring is detached from the bracket ring;

wherein after creating the opening in the ceiling panel, light is adapted to exit from the lighting module through the bracket ring opening and the ceiling panel opening.

2. The light fixture assembly of claim 1, wherein the alignment ring comprises an opening and an annular channel formed along the opening, wherein the adjustment mechanism comprises a rotating bar comprising opposite ends that are received within the annular channel such that the rotating bar rotates within the alignment ring opening.

3. The light fixture assembly of claim 2, wherein each opposite end of the rotating bar comprises protrusions or ball bearings that are captured and travel within the annular channel.

4. The light fixture assembly of claim 2, wherein the adjustment mechanism comprises a disc that longitudinally travels along the rotating bar, wherein the disc comprises the guide and is laterally adjusted within the alignment ring opening to the desired position.

5. The light fixture assembly of claim 1, wherein at least one of the alignment ring and the bracket ring comprises a plurality of magnets circumferentially dispersed thereon.

6. The light fixture assembly of claim 1, wherein at least one of the bracket ring and the alignment ring comprise at least one of a metal material, a magnetic material, and any combinations thereof.

7. The light fixture assembly of claim 1 further comprising a lighting module holder within the housing, wherein the lighting module is removably attached to the lighting module holder; wherein after the opening is created through the ceiling panel, the lighting module is inserted through the ceiling panel opening and the bracket ring opening and attached to the lighting module holder.

8. The light fixture assembly of claim 1, wherein the alignment ring comprises a plurality of alignment indicators to facilitate alignment with other light fixture assemblies.

9. The light fixture assembly of claim 1, wherein the housing comprises a housing baseplate located adjacent the bracket ring, wherein the housing baseplate comprises a material capable of being cut such that after locating the bracket ring using the alignment ring an additional opening is cut through the housing baseplate corresponding to the desired position.

10. The light fixture assembly of claim 9, wherein the baseplate is adapted to be cut by at least one of a hole saw, a rotor saw, a hole cutting drill bit.

11. The light fixture assembly of claim 1, wherein the bracket ring is an adjustable bracket ring adapted to laterally travel with respect to the housing; wherein after attaching the alignment ring to the bracket ring through the ceiling panel, displacing the alignment ring along the ceiling panel moves the adjustable bracket ring within the housing.

12. A light fixture assembly comprising:

a housing that supports a lighting module and a bracket ring comprising an opening, wherein the housing comprises a housing baseplate adjacent to and covering the bracket ring opening, wherein the housing is adapted to be installed in a ceiling behind a first side of a ceiling panel such that the ceiling panel covers the housing baseplate; and a removable alignment ring adapted to magnetically attach to the bracket ring through and on a second side opposite the first side of the ceiling panel and the housing baseplate to locate the bracket ring, wherein the alignment ring comprises a guide for indicating a desired position of an opening to be created in the ceiling panel and the base plate;

wherein after indicating the desired position of the ceiling panel opening, the alignment ring is detached from the bracket ring;

wherein the housing baseplate comprises a material capable of being cut such that after locating the bracket ring using the alignment ring an opening is cut through the ceiling panel and the housing baseplate corresponding to the desired position;

wherein after creating the opening in the ceiling panel, light is adapted to exit from the lighting module through the bracket ring opening, the baseplate opening, and the ceiling panel opening.

13. The light fixture assembly of claim 12, wherein the alignment ring comprises an adjustment mechanism that is laterally adjusted within the alignment ring to the desired position.

14. The light fixture assembly of claim 12, wherein the bracket ring comprises an adjustable bracket ring adapted to laterally travel with respect to the housing; wherein after attaching the alignment ring to the bracket ring through the ceiling panel, displacing the alignment ring along the ceiling panel moves the adjustable bracket ring within the housing.

15. The light fixture assembly of claim 12, wherein the baseplate is adapted to be cut by at least one of a hole saw, a rotor saw, a hole cutting drill bit.

16. A light fixture assembly comprising:

a housing that supports a lighting module and an adjustable bracket ring comprising an opening, wherein the adjustable bracket ring is adapted to laterally travel with respect to the housing, wherein the housing is adapted to be installed in a ceiling behind a first side of a ceiling panel such that the ceiling panel covers the bracket ring opening; and a removable alignment ring adapted to magnetically attach to the bracket ring through and on a second side opposite the first side of the ceiling panel to locate the bracket ring, wherein the alignment ring is adapted to be displaced along the ceiling panel and move the adjustable bracket ring within the housing to a desired position, wherein the alignment ring comprises a guide for indicating the desired position of an opening to be created in the ceiling panel;

wherein after indicating the desired position of the ceiling panel opening, the alignment ring is detached from the bracket ring;

wherein after creating the opening in the ceiling panel, light is adapted to exit from the lighting module through the adjustable bracket opening and ceiling panel opening.

17. The light fixture assembly of claim 16, wherein the housing comprises a housing baseplate located adjacent the adjustable bracket ring, wherein the housing baseplate comprises a material capable of being cut such that after locating the bracket ring using the alignment ring an additional opening is cut through the housing baseplate corresponding to the desired position.

18. The light fixture assembly of claim 16, wherein the adjustable bracket ring is slidably disposed between a first pair of parallel rails such that the adjustable bracket ring slidably travels along the first pair of rails.

19. The light fixture assembly of claim 18, wherein the first pair of rails are slidably disposed between a second pair of parallel rails such that the adjustable bracket ring also slidably travels along the second pair of rails.

20. The light fixture assembly of claim 16, wherein the adjustable bracket ring comprises a gear ring that slidably travels along at least one of a linear gear rail, a worm gear, and any combinations thereof.

21. The light fixture assembly of claim 20, wherein the worm gear is actuated by a motor.

22. The light fixture assembly of claim 16, wherein the adjustable bracket ring comprises a worm gear linear actuator that travels along a linear worm gear.

* * * * *